United States Patent
Agarwal

(10) Patent No.: US 7,920,477 B2
(45) Date of Patent: Apr. 5, 2011

(54) NETWORK LAYER ERROR CONTROL SYSTEMS AND METHODS

(75) Inventor: Anil Agarwal, North Potomoc, MD (US)

(73) Assignee: ViaSat, Inc., Carlsbad, CA (US)

( * ) Notice: Subject to any disclaimer, the term of this patent is extended or adjusted under 35 U.S.C. 154(b) by 198 days.

(21) Appl. No.: 12/019,287

(22) Filed: Jan. 24, 2008

(65) Prior Publication Data

US 2008/0175247 A1    Jul. 24, 2008

Related U.S. Application Data

(60) Provisional application No. 60/886,349, filed on Jan. 24, 2007.

(51) Int. Cl.
*G06F 11/00* (2006.01)
(52) U.S. Cl. ..................................... 370/236
(58) Field of Classification Search .................. 370/287, 370/236

See application file for complete search history.

(56) References Cited

U.S. PATENT DOCUMENTS

| | | | |
|---|---|---|---|
| 5,109,384 | A | 4/1992 | Tseung |
| 5,629,948 | A * | 5/1997 | Hagiwara et al. ............. 714/748 |
| 6,031,818 | A | 2/2000 | Lo |
| 6,289,012 | B1 | 9/2001 | Harrington et al. |
| 6,349,208 | B1 | 2/2002 | Sexton et al. |
| 6,374,117 | B1 | 4/2002 | Denkert et al. |
| 6,493,342 | B1 | 12/2002 | Breslow et al. |
| 6,577,642 | B1 | 6/2003 | Fijolek et al. |
| 6,925,096 | B2 | 8/2005 | Haartsen |
| 6,937,864 | B2 | 8/2005 | Koo et al. |
| 7,000,021 | B1 * | 2/2006 | Radhakrishnan et al. ..... 709/230 |
| 7,145,889 | B1 * | 12/2006 | Zhang et al. ................... 370/329 |
| 7,330,439 | B1 | 2/2008 | Puuskari et al. |
| 2003/0012178 | A1 * | 1/2003 | Mussman et al. ............. 370/352 |
| 2003/0174663 | A1 | 9/2003 | Dillon |
| 2003/0212827 | A1 * | 11/2003 | Saha et al. ..................... 709/247 |
| 2006/0098659 | A1 * | 5/2006 | Chinner ......................... 370/394 |
| 2007/0091908 | A1 * | 4/2007 | Saito et al. ..................... 370/401 |
| 2008/0212510 | A1 | 9/2008 | Larsson |
| 2008/0317017 | A1 | 12/2008 | Wiemann et al. |

FOREIGN PATENT DOCUMENTS

WO    WO 00/35163 A    6/2000

(Continued)

OTHER PUBLICATIONS

Andrei Gurtov, Reiner Ludwig: "Lifetime Packet Discard for Efficient Real-Time Transport over Cellular Links", Nov. 26, 2003, pp. 1-14.

(Continued)

*Primary Examiner* — Derrick W Ferris
*Assistant Examiner* — Mang Yeung
(74) *Attorney, Agent, or Firm* — Kilpatrick Townsend & Stockton, LLP

(57) ABSTRACT

Systems, methods, and devices for novel error detection and retransmission processes are described. These processes may be implemented on intermediate communication links between two end terminals, wherein the intermediate links are via satellite. Error control mechanisms to detect and retransmit lost or corrupted frames may be implemented at the network layer, or between the network and data link layers. Processes for discovering error control protocol-aware terminals are described. Features of these error control processes may include a configurable delay limit, tailored to traffic type or class.

24 Claims, 29 Drawing Sheets

FOREIGN PATENT DOCUMENTS

| WO | WO 00/60799 A | 10/2000 |
|---|---|---|
| WO | WO 2005/060200 A | 6/2005 |

OTHER PUBLICATIONS

International Search Report dated Feb. 2, 2009, International Application No. PCT/US2008/051941, filed Jan. 24, 2008, 6 pages.
U.S. Appl. No. 12/019,292, Office Action dated Apr. 27, 2010, 27 pages.
U.S. Appl. No. 12/019,297, Office Action dated Sep. 23, 2010, 30 pages.
Invitation to Pay Additional Fees And, Where Applicable, Protest Fee, International Searching Authority, dated Jul. 23, 2008, corresponding to PCT Application No. PCT/US2008/051941, including results of the Partial International Search.
Phoel W G: "Concepts for Reliable Satellite Communications Over Blockage Channels" IEEE Military Communications Conference, Oct. 17, 2005-Oct. 20, 2005, pp. 1-6.

* cited by examiner

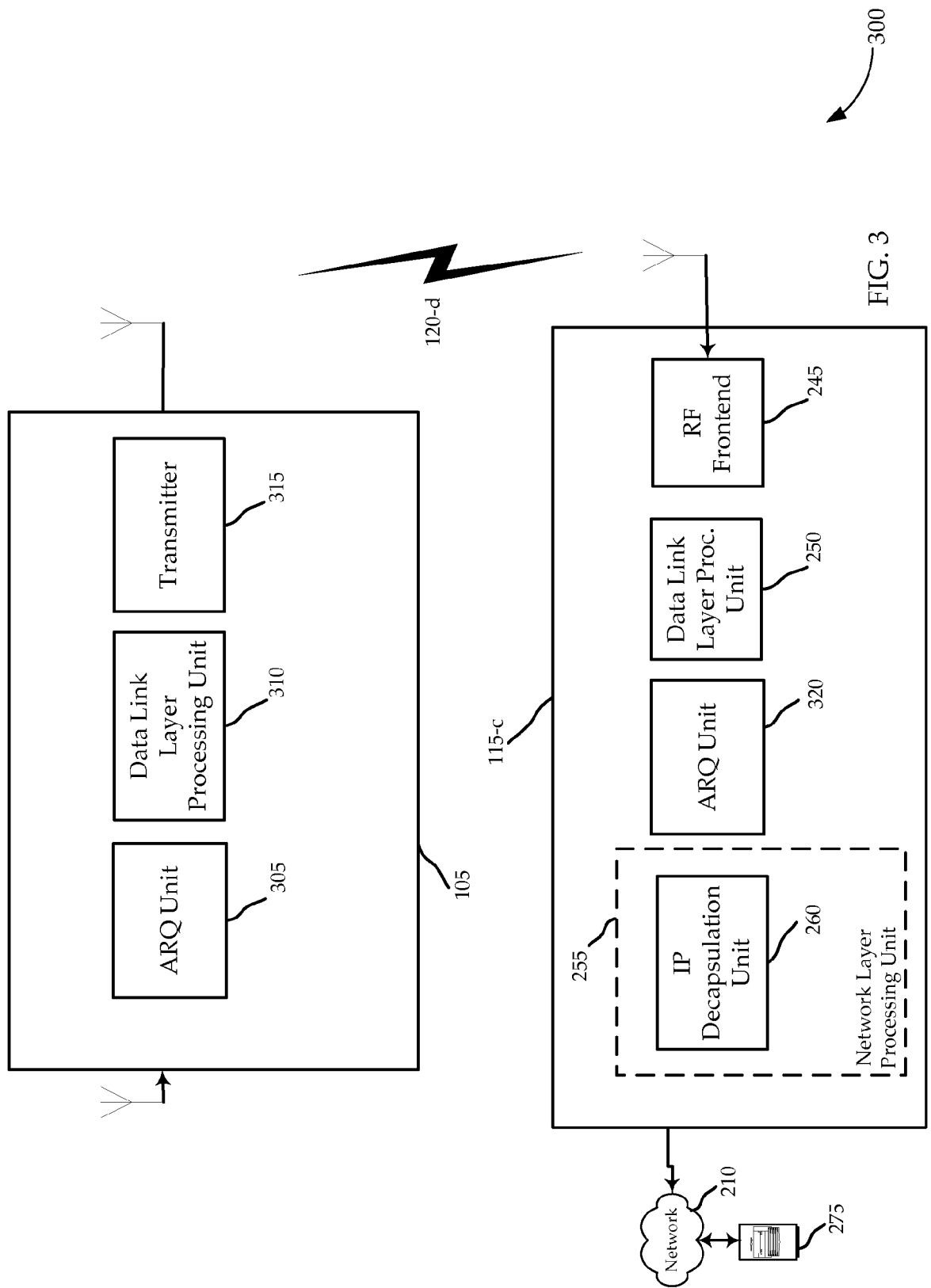

| Traffic Content Classification | QoS | Delay Limits |
|---|---|---|
| Streaming Audio | 1 | Delay1.1 |
| Streaming Audio | 2 | Delay1.2 |
| Streaming Video | 1 | Delay2.1 |
| Streaming Video | 2 | Delay2.2 |
| Interactive Voice | 1 | Delay3.1 |
| Interactive Voice | 2 | Delay3.2 |
| Interactive Video | 1 | Delay4.1 |
| Interactive Video | 2 | Delay4.2 |
| Other | 1,2 | None |

FIG. 14

NETWORK LAYER ERROR CONTROL SYSTEMS AND METHODS

CROSS REFERENCE

This application claims priority from U.S. Provisional Patent Application No. 60/886,349, filed on Jan. 24, 2007, entitled "ENHANCED ERROR CONTROL MECHANISMS FOR SATELLITE COMMUNICATIONS". It is related to U.S. patent application Ser. No. 11/298,612, filed Dec. 12, 2005, entitled "TRANSMISSION CONTROL PROTOCOL WITH PERFORMANCE ENHANCING PROXY FOR DEGRADED COMMUNICATION CHANNELS". This application hereby incorporates by reference the content of the aforementioned applications in their entirety, and for all purposes.

BACKGROUND

The present invention relates to error control for communications in general and, in particular, to error control enhancements for satellite communications.

In wireless communications, there are a number of conditions that may impair particular links. These conditions include weather, interference, jamming, and congestion. However, the effects of these conditions may be mitigated by various techniques known in the art, including FEC (Forward Error Correction), interleaving, variable coding and modulation, power control, QoS (Quality of Service), and queuing/scheduling algorithms.

However, in certain instances, there may be conditions that are not sufficiently mitigated by the above listed techniques. For example, in satellite communications, nuclear scintillation and "communications on the move" (COTM) related impairments may result in packet losses or other errors that are not sufficiently cured by such techniques. This may be particularly true in urban areas, where man-made structures (e.g., buildings, bridges, etc.) may impede signals as COTM terminals move about. Such blockages may negatively affect communications performance in terrestrial wireless systems also. There are, thus, a variety of instances when nuclear scintillation, COTM, and other impairments may block or severely degrade signals. It may, therefore, be desirable to identify novel error detection and retransmission strategies in order to address these impairments, and moreover to handle these issues for various types and classes of service.

SUMMARY

Novel error detection and retransmission systems, methods, devices, and software are described. These processes may be implemented on intermediate communication links between two end terminals, wherein the intermediate links are via satellite. Error control mechanisms to detect and retransmit lost or corrupted frames may be implemented at the network layer. Processes for discovering and updating error control protocol-aware terminals are described, as well. Features of these error control processes may include a configurable delay limit, tailored to traffic type or class.

In one set of embodiments, error control mechanisms to detect and retransmit lost or corrupted frames are implemented at the network layer (e.g., the Internet Protocol (IP) layer). In an alternative embodiment, these error control mechanisms to detect and retransmit data are implemented between the network layer and data link layer. Such error control may be referred to generally herein as Automatic Repeat reQuest (ARQ) error control mechanisms. These error control mechanisms may be implemented between two terminals (e.g., COTM terminals, fixed terminals, or combinations thereof) communicating via satellite. Alternatively, they may be implemented between a terminal and a satellite, or in various other links.

In one such embodiment, an example system is described which includes a first terminal configured to receive a data packet from an initiating terminal, the data packet destined for an end terminal via a second terminal. The first terminal generates an error control header for the received data packet, and encapsulates the error control header for transmission at the network layer appended to the first data packet. A second terminal, in communication with the first terminal via the satellite, receives the error control header with the appended data packet. The second terminal processes the error control header to analyze the error control information, and generates a responsive data packet with acknowledgement information for transmission to the first terminal at the network layer.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

FIG. 3 is a block diagram of a satellite communications system, illustrating selected devices and components for satellite to terminal communication, configured according to various embodiments of the invention.

FIG. 14 is a block diagram illustrating a table associating different types of traffic content with delay limits for error control terminals according to various embodiments of the invention.

DETAILED DESCRIPTION OF THE INVENTION

Novel error detection and retransmission processes for communication systems are described. In certain embodiments, these processes are implemented on intermediate communication links between two end terminals, wherein the intermediate links are via satellite. In one set of embodiments, error control mechanisms to detect and retransmit lost or corrupted frames are implemented at the network layer. In another set of embodiments, processes for discovering and updating error control protocol-aware terminals are described. In a third set of embodiments, features of these error control processes include a configurable delay limit, which may be tailored to traffic type or class.

This description provides example embodiments only, and is not intended to limit the scope, applicability, or configuration of the invention. Rather, the ensuing description of the embodiments will provide those skilled in the art with an enabling description for implementing embodiments of the invention. Various changes may be made in the function and arrangement of elements without departing from the spirit and scope of the invention.

Thus, various embodiments may omit, substitute, or add various procedures or components as appropriate. For instance, it should be appreciated that in alternative embodiments, the methods may be performed in an order different than that described, and that various steps may be added, omitted, or combined. Also, features described with respect to certain embodiments may be combined in various other embodiments. Different aspects and elements of the embodiments may be combined in a similar manner.

It should also be appreciated that the following systems, methods, and software may individually or collectively be components of a larger system, wherein other procedures may take precedence over or otherwise modify their application. Also, a number of steps may be required before, after, or concurrently with the following embodiments.

Figure 1:
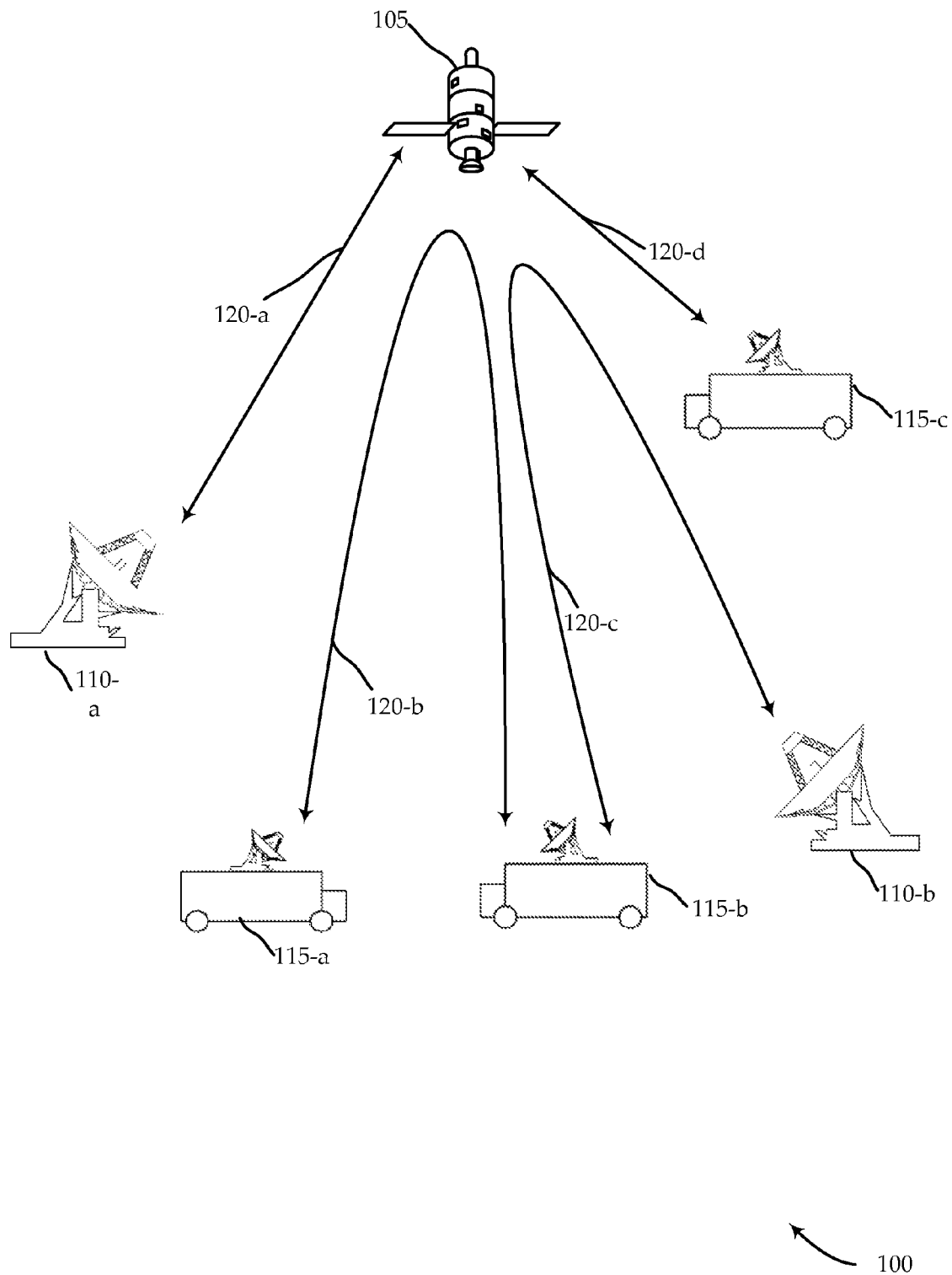
FIG. 1 is a block diagram of a satellite communications system configured according to various embodiments of the invention.

Systems, methods, devices, and software are described for novel error control communications to detect and retransmit lost or corrupted frames in a communications system. Referring to FIG. 1, a block diagram is shown illustrating a satellite communications system 100 with various links 120 in which the error control communications described herein may be implemented. The system 100 includes a satellite 105, in communication with various fixed terminals 110 and COTM terminals 115.

In some embodiments, one or more of the error control processes are implemented in the network layer of a link 120-d between a satellite 105 and a COTM terminal 115-c (in either direction). In another embodiment, the error control processes are implemented in the network layer of a link 120-b between a first COTM terminal 115-a and a second COTM terminal 115-b. In a related embodiment, the error control processes are implemented in the network layer of a link 120-c between a COTM terminal 115-b and a fixed terminal 110-b (in either direction). These error control processes may be implemented in links (not shown) between two fixed terminals 110, between a satellite 105 and fixed terminal 110, or other combinations, as well. It is also worth noting that these error control mechanisms may be implemented within a network layer carrying encrypted data that is transported via IP tunneling. In some embodiments, the error control processes described herein are implemented between the network and data link layers. In still other embodiments, aspects of the error control communications (e.g., delay limits) described herein may be implemented at the data link or transport layers.

For purposes of the following discussion, the terms "transmitter" and "receiver" are used, but it is worth noting the above links may be bi-directional, so a given terminal may be both a transmitter and receiver simultaneously. For purposes of implementing certain embodiments of the invention, terminals include "ARQ units," which may be integrated processing units at a terminal allowing a terminal to create, transmit, and identify the error control packets described herein, and engage in the ARQ sessions described. The ARQ units may buffer data from ARQ packets at the transmit end until reception is confirmed or a timeout occurs.

The error control processes described herein may be made up of error control techniques to identify lost or damaged packets, and then retransmit identified packets if an applicable delay timer has not expired. As noted above, such error control techniques may be referred to herein as ARQ error control mechanisms, or simply as ARQ. In one embodiment, packets are retransmitted only in response to specific NACKs identifying a missing packet or set of packets. In another embodiment, a hybrid scheme is used which is made up of a generalized retransmission strategy, in which selective retransmission and Go-Back-N retransmission are two particular cases. An entire spectrum of behaviors between selective retransmission and Go-Back-N can be realized by suitably configuring the size of buffers available at the receiver for saving out-of-sequence packets, and otherwise setting forth parameters for detection and transmission based on a variety of factors. The receiver saves received packets in a buffer (e.g., for an amount of time associated with the delay limit), and thereby allows for delivery of packets in sequence even when they are received out of order.

In one set of embodiments, various methods and systems for discovering error control protocol-aware terminals are described. A transmitting terminal with an ARQ unit receives an IP packet with a destination IP address. The transmitting terminal may not be aware of the correspondence between the destination IP address and the particular receiving terminal (and associated ARQ unit). The transmitting terminal may send a probe packet with an ARQ identifier to the destination IP address, and the receiving terminal intercepts the probe using the identifier. The receiving terminal responds, and the ARQ table for each terminal is updated. Methods and systems are also described for updating ARQ tables. When users move between terminals, the ARQ tables in the terminals identifying their location may be updated to allow continued error control between terminals in a dynamic environment.

In one set of embodiments, features of these error control mechanisms include a configurable delay limit tailored to traffic type or class. IPv4 and IPv6 packets each include a one byte Type of Service (ToS) or Differentiated Services (DiffServ) field. As will be discussed in greater detail below, this field may be used to indicate the underlying service being transported. For example, the field could be used to define the delay sensitivity of the frame being transported. Frames with different delay sensitivities (e.g., UDP v. TCP packets, voice v. e-mail) may then be configured with different delay limits at the transmitter, along with related time limits for buffering at the receiver. Using varied delay limits, multiple different ARQ sessions with differing delay limits may take place concurrently between terminals (or between a terminal and a satellite).

A receiver may be configured to transmit NACKs (and, possibly, ACKs) on a periodic basis. A receiver may receive a polling request (e.g., a status request) from a transmitter to initiate the transmission, or may initiate the NACKs internally. The internally or externally initiated polling period may be configurable based on a number of factors (e.g., particular terminals involved, estimated RTT, network error rate, link load, receipt of out-of-sequence packets, type or quality of service, etc.). In one embodiment, the polling period may be decreased (i.e., increasing the regularity of the ACK/NACK transmissions) when traffic is light. In another embodiment, retransmission is based only on NACKs, and this may decrease the number of unnecessary retransmissions.

In other embodiments, progressive retransmission schemes may be used under severely degraded link conditions. Progressive transmission is a process which may be used if a given frame is unsuccessfully transmitted a certain number of times (e.g., 3 unsuccessful transmissions). After this threshold is reached, more than one copy of the frame is transmitted, with the retransmitted frames spaced in time. This progressive retransmission puts additional burden on bandwidth, but may be useful in severely degraded link environments in lighter traffic periods. The threshold, the number of packets retransmitted, and the timing increments may be configurable.

Figure 2:
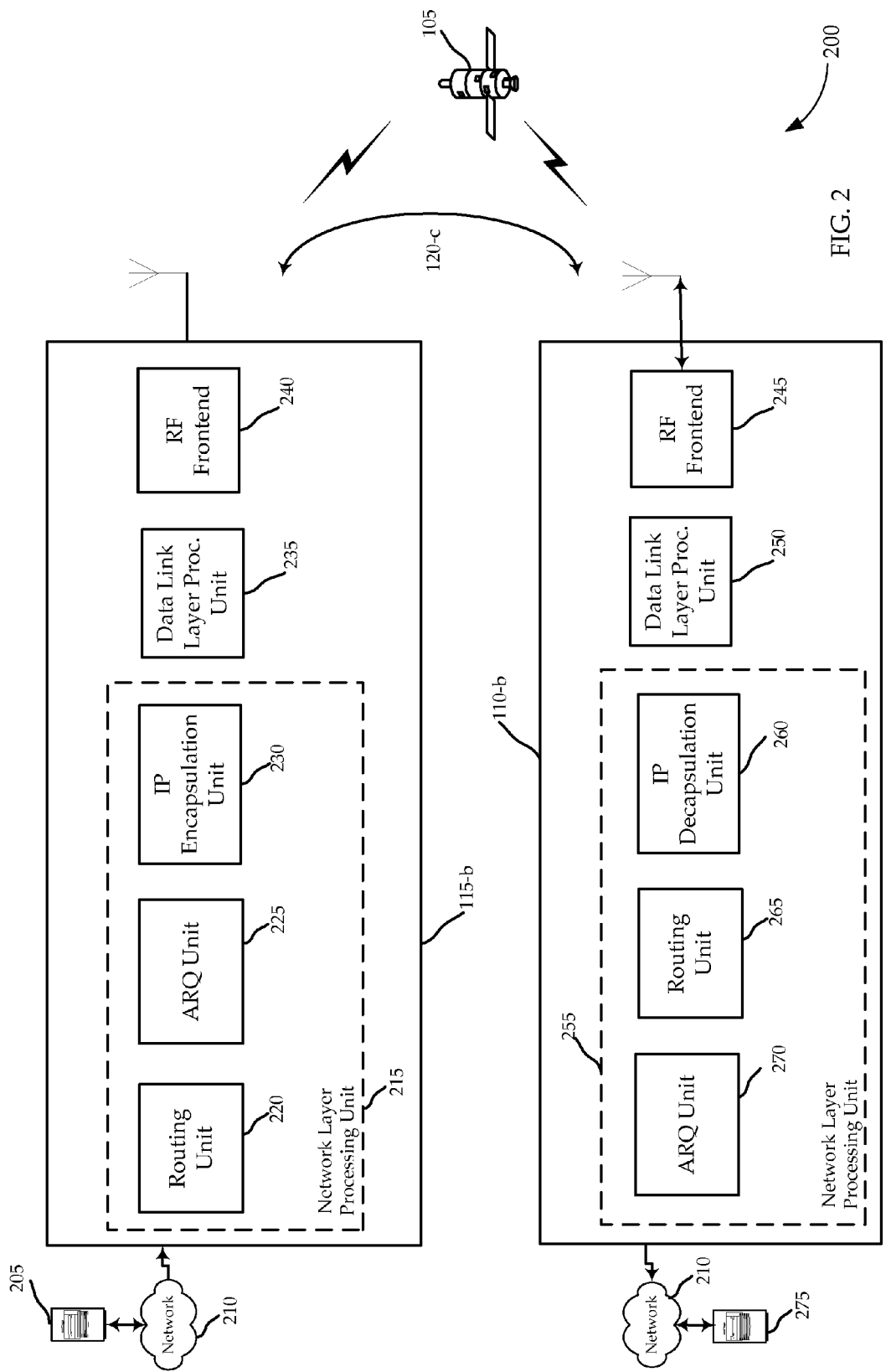
FIG. 2 is a block diagram of a satellite communications system, illustrating selected devices and components for terminal to terminal communication, configured according to various embodiments of the invention.

Referring to FIG. 2, a block diagram is shown illustrating an example configuration 200 for certain devices of the satellite communications system 100 of FIG. 1. While the example configuration illustrates communication between a COTM terminal 115 and fixed terminal 110, those skilled in the art will recognize that similar components may be used between other links for the same or other types of terminals, or between a satellite and a terminal.

In one embodiment, an initiating terminal 205 (e.g., a user device or terminal, or a server) transmits data via a network (e.g., the Internet or a wireless local area network (LAN)) to the COTM terminal 115-b. The data is received by the COTM terminal 115-b. The COTM terminal 115-b is made up of a network layer processing unit 215 (including a routing unit 220, an ARQ unit 225 and an IP Encapsulation Unit 230), a data link layer processing unit 235, an RF frontend 240, and other components known in the art. The received data may, for example, be an IP packet carried by a wireless signal.

After some intermediate processing by other components (not shown) of the COTM terminal 115-b, the IP packet may be received by the routing unit 220 of the network layer processing unit 215. The routing unit 220 may evaluate the destination address of the received IP packet, and recognize that it will be forwarded to a similar error control protocol-aware terminal, such as fixed terminal 110-b (e.g., through the satellite 105 via link 120-c). This lookup functionality may be achieved by having the routing unit 220 maintain or otherwise access a table that lists certain destination IP or other addresses that are associated with ARQ units. Thus, the routing unit 220 may make a threshold determination as to whether the IP packet is directed to or through a node that can engage in an ARQ session at the IP layer, as described herein.

Instead of simply encapsulating the received IP packet and forwarding it to the data link layer processing unit 235, the network layer processing unit 215 may assign processing responsibilities for the received IP packet to an ARQ unit 225. The ARQ unit 225 may create an ARQ header to be associated with the received IP packet, the ARQ header including sequence number, session number, a timestamp, a retransmission delay limit, buffering time limits for a receiving terminal, and other information and/or identifiers for error detection. The ARQ unit 225 may evaluate a Type of Service indicator in the received IP packet, and place the packet in the appropriate session based on the type of service (e.g., UDP v. TCP). In this way, packets with different delay sensitivities or quality of service guarantees may have different delay timers, buffer or window sizes, polling timers, etc. The ARQ unit 225 may buffer the data packet to be transmitted until acknowledgement information is received and/or processed to determine whether the data packet was received. The ARQ unit 225 may buffer the data packet (allowing for possible retransmission) until a delay timer expires, and then discard the packet.

An IP encapsulation unit 230 may then encapsulate the ARQ header in an additional IP header, and append its associated IP packet, indicating in this IP header that it is an ARQ IP packet. The indicator in the additional IP header may be used as a signal to other error control protocol-aware terminals that the packet includes an ARQ header and is to be processed by a receiving ARQ unit at the network layer. As used herein, the terms "error control protocol-aware terminal" or "network layer error control protocol-aware terminal" may describe a terminal configured with an ARQ unit similar to ARQ unit 225, and located on the routing path to a destination network address. The IP encapsulation unit 230 may forward the ARQ packet to the data link layer processing unit 235, where a data link protocol (e.g., HDLC) is applied. The link layer packet is then processed by RF frontend 240, and transmitted via a wireless signal through the satellite 105 to the fixed terminal 110-b.

The fixed terminal 110-b receives the signal. The fixed terminal 110-b in this embodiment is made up of an RF frontend 245, data link layer processing unit 250, and a network layer processing unit 255 (including an IP decapsulation unit 260, routing unit 265, and ARQ unit 270). Its RF frontend 245 may downconvert, amplify, and demodulate the signal, thereby reproducing the link layer packet from the COTM terminal 115-b. In cases where the satellite provides IP routing functionality but no ARQ functionality, the received link layer packet header is generated by the satellite. The data link layer processing unit 250 of the fixed terminal 110-b may process the received packet, as known in the art, to produce the ARQ IP packet. An IP decapsulation unit 260 may receive the ARQ IP packet, process the identifier in the header to recognize the packet as an ARQ IP packet, and forward it to the ARQ unit 270 for processing.

The ARQ unit 270 of the receiving fixed terminal 110-b may analyze a sequence number, timestamp, retransmission delay limit, time limit for buffering, and any additional error control information from the ARQ header created by the ARQ unit 225 of the COTM terminal 115-b. The ARQ unit 270 of the fixed terminal 110-b may analyze this error control information, in light of other ARQ packets received from the session, and transmit acknowledgement information (ACKs, NACKs, and/or other status information) to the ARQ unit 225 of the COTM terminal 115-b. The ARQ unit 270 of the fixed terminal 110-b may generate a response packet with the acknowledgement information in response to the received error control header, and the acknowledgement information may be encapsulated at the network layer. The response packet may be forwarded to the data link layer processing unit 250, where a data link protocol (e.g., HDLC) is applied. The link layer packet is then processed by RF frontend 245, and transmitted via a wireless signal through the satellite 105 back to the ARQ unit 225 of the COTM terminal 115-b. The COTM terminal 115-b, upon receiving acknowledgement information that includes a NACK, may retransmit the buffered data packets (perhaps on the condition that time remains for an applicable delay limit).

The ARQ unit 270 of the receiving fixed terminal 110-b may determine that the data packet is an out-of-sequence data packet, and buffer the packet until preceding data packets are received and forwarded to the end terminal (or a time limit based on a delay limit expires). The ARQ unit 270, in one embodiment, may wait to forward the buffered data packet to the end terminal until determining the data packet has become an in-sequence data packet, and that the intervening packets have been forwarded. In one embodiment, a buffered data packet may be retained until a buffering time limit is exceeded or neared (e.g., when a discard or forwarding time is specified for immediately before the time limit expires). In such instances, the buffered data packet may then be forwarded out-of-sequence and then discarded. (Note that if the IP decapsulation unit 260 identified the packet as a non-ARQ IP packet, other components (not shown) of the network layer processing unit 255 of the fixed terminal 110-b may otherwise process the packet at the IP layer).

Once the ARQ unit 270 processing is underway or completed, other components may further process and/or forward the packet out of the fixed terminal 110-b. The data which originated at initiating terminal 205, and was routed through the COTM terminal 115-b, satellite 105, and fixed terminal 110-b, may then be passed through a network 210 to an end terminal 275. The initiating terminal 205 and the end terminal 275 may each be remote from the COTM terminal 115-b and fixed terminal 110-b, thus the link may be an intermediate link within the end to end connection. In addition to the above described error control procedures, it is worth mentioning that the initiating terminal 205 may also buffer the first data packet until an acknowledgement is received from the end terminal 275 (e.g., using a distinct TCP connection to provide multiple error control links). Although the above description is directed at a link between a COTM terminal 115 and a fixed terminal 110, a similar process and components may be applied to other terminal to terminal, or satellite to terminal connections, as well.

A number of alternative embodiments are available, as well. For example, referring to FIG. 3, a block diagram is shown illustrating an example configuration 300 of components for the satellite communications system 100 of FIG. 1. The diagram illustrates certain differences from the terminal-to-terminal processing described above. Note that in this embodiment the ARQ unit is located on the satellite 105, which communicates with a COTM terminal 115-c over link 120-d. The satellite 105 includes an ARQ unit 305, a data link layer processing unit 310, a transmitter 315, and may include other components known in the art.

In one embodiment, data is received by the satellite, perhaps from a fixed terminal 110. The received data may, for example, include an IP packet carried by a wireless signal. After some intermediate processing, the IP packet may be received by the ARQ unit 305. The ARQ unit 305 may evaluate a destination (IP or other) address associated with the received IP packet, and recognize that it will be passing through the ARQ-aware COTM terminal 115-c, via link 120-d. This lookup functionality could be achieved by having the ARQ unit 305 maintain or otherwise access a table that lists MAC addresses or other terminal addresses that are associated with ARQ units capable of ARQ sessions according to particular embodiments of the invention.

Instead of simply passing the received IP packet to the data link layer processing unit 310, the ARQ unit 305 may create an ARQ header to be associated with the received IP packet, the ARQ header including a sequence number, a session identifier, a timestamp, time and/or delay limits, and other information for error detection. The ARQ unit 305 may place the packet in an appropriate session based on the type of service (e.g., real-time interactive v. email). In this way, packets with different delay sensitivities or quality of service guarantees may have different delay timers, buffer or window sizes, polling timers, etc., and these parameters may be isolated to the satellite to terminal links.

The ARQ unit 305 may forward the ARQ header and associated IP packet to the data link layer processing 310 unit, where a data link protocol (e.g., HDLC) is applied, encapsulating the ARQ header and associated IP packet. Thus, in this embodiment, the error control data is located between the network and data link layers. The link layer packet is then processed by the transmitter 315, and sent via a wireless signal through the satellite 105 to the COTM terminal 115-c.

The COTM terminal 115-c receives the signal. The COTM terminal 115-c in this embodiment is made up of an RF frontend 245, a data link layer processing unit 250, an ARQ unit 320, and a network layer processing unit 255 (including an IP decapsulation unit 260). Its RF frontend 245 may downconvert, amplify, and demodulate the signal, thereby producing the link layer packet from the satellite 105. The data link layer processing unit 250 of the COTM terminal 115-c may process the received packet, as known in the art, to produce the ARQ header and associated IP packet. The data link layer processing unit 250 may recognize an identifier in the data link layer header, and forward the packet to the ARQ unit 320 for processing. The ARQ unit 320 may analyze the sequence number, timestamp, and other information, in light of other ARQ packets received from the session. The ARQ unit 320 may then transmit ACKs, NACKs, and other status information to the ARQ unit 305 of the satellite 105. Once the ARQ unit processing is complete, a network layer processing unit 255 may receive the IP packet, and the IP decapsulation unit 260 may process the packet as a regular IP packet, and forward the packet out of the COTM terminal 115-c (e.g., the packet, without its ARQ header, may be processed by the IP decapsulation unit 260). Other components may further process and/or forward the packet out of the COTM terminal 115-b, to then be passed through a network 210 to an end terminal 275.

Thus, while in some embodiments the error control data may be encapsulated at the network layer, in other embodiments the error control data may be encapsulated between the network layer and data link layers. In still other embodiments, certain aspects of the error control protocols described herein may be implemented at the data link layer or transport layer, for example. Moreover, although the description with reference to FIG. 3 is directed at a link from a satellite 105 to a COTM terminal 115, the session at issue may also be from the COTM terminal 115 to the satellite 105, wherein the ARQ header formatting is applied at the COTM terminal 115, and then received and processed at the satellite 105. According to the embodiment described with reference to FIG. 3, the satellite 105 may, therefore, operate as a receiver and transmitter for the same IP packet (e.g., with a COTM terminal 115-a to satellite 105 link, and then from the satellite 105 to COTM terminal 115-b link). Also, although the above description is directed at the link between a satellite 105 and COTM terminal 115, a similar process and components may be applied to other satellite 105 to fixed terminal 110 links 120-a, as well, or in a number of other terminal to terminal connections.

It is worth noting that the components of a fixed terminal 110, COTM terminal 115, or satellite 105 of FIG. 2 or 3 may be implemented, in whole or in part, in hardware. Thus, they may each be made up of one, or more, Application Specific Integrated Circuits (ASICs) adapted to perform a subset of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. Each may also be implemented, in whole or in part, with instructions embodied in a memory, formatted to be executed by one or more general or application specific processors. The tables described above may be stored in local memory.

Figure 4A:
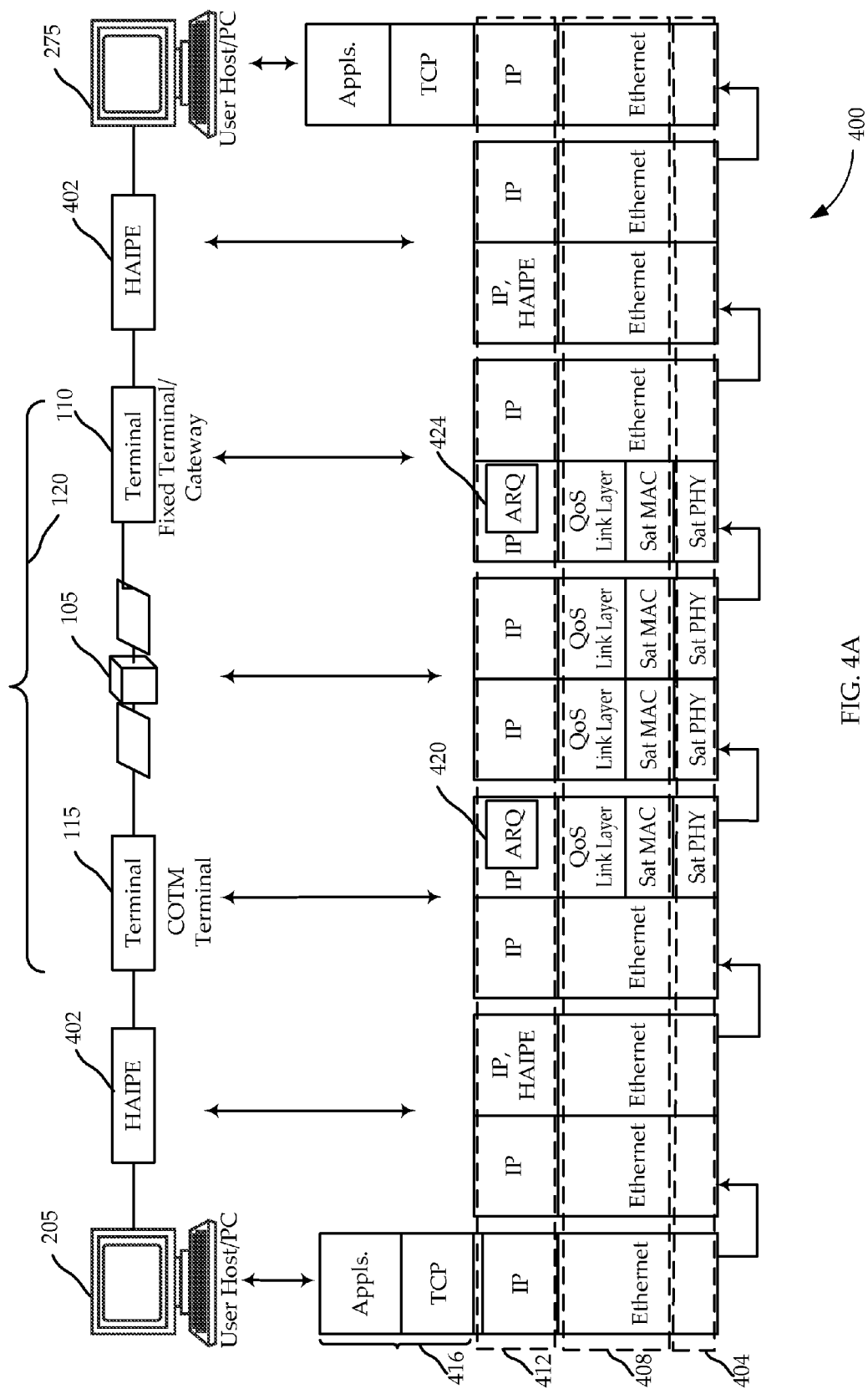
FIG. 4A is a block diagram illustrating an example of the protocol layering for certain packet formatting occurring on a series of links according to various embodiments of the invention.

Referring to FIG. 4A, a block diagram is shown illustrating an example of the protocol layering for certain packet formatting 400 occurring on a series of links between two users 205, 275. In one embodiment, an intermediate link 120 (e.g., from the system 100 of FIG. 1) is between a COTM terminal 115 and a fixed terminal 110. FIG. 4A illustrates the physical layer 404, data link layer 408, network layer 412, and transport and application layer 416 processing that may occur at each user terminal 205, 275, HAIPE terminal 402, intermediate terminal 110, 115, or satellite 105. FIG. 4A also illustrates how the ARQ error control data may be created at the COTM terminal 115 IP layer 420, and be processed at the IP layer 424 by the receiving fixed terminal 110. In these embodiments, therefore, ARQ operates over a terminal to terminal IP tunnel. In other embodiments, the illustrated packet formatting may take place between other terminal to terminal or terminal to satellite connections.

Figure 4B:
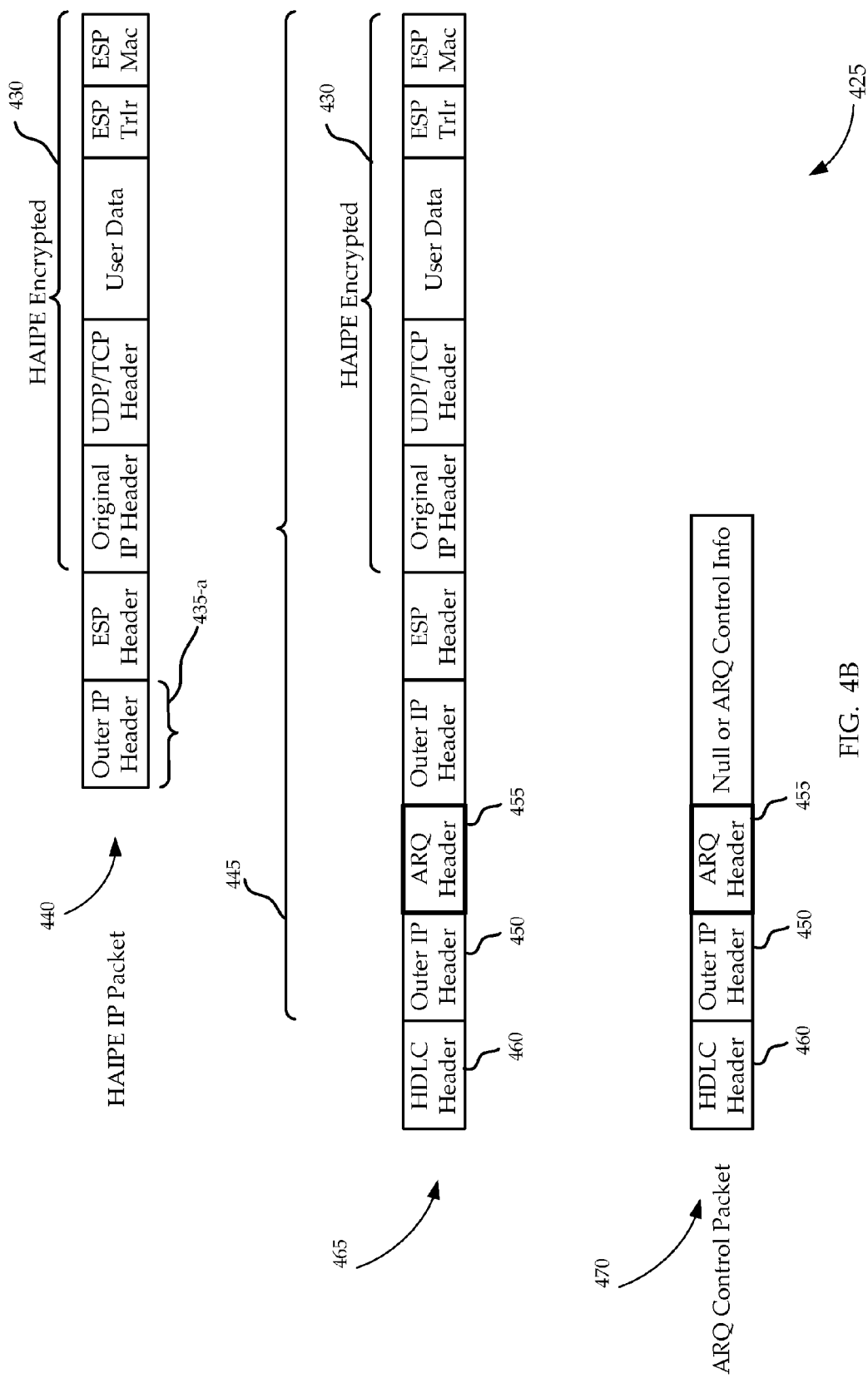
FIG. 4B is a block diagram illustrating an example of the frame structure for certain error control transmissions at the network layer according to various embodiments of the invention.

Referring next to FIG. 4B, a block diagram is shown illustrating an example of the frame structure 425 for various embodiments of the invention. This may, for example, be the frame format generated at the COTM terminal 115, as set forth the FIG. 4A. Thus, in this embodiment, a COTM terminal 115 may receive a HAIPE encrypted IP packet 430 encapsulated by an unencrypted IP header 435-a, thereby forming a payload made up of an IP packet 440 (note that in other embodiments, other types of packets could be received or otherwise created at the COTM terminal 115 to form the payload; e.g., the payload could be an IP packet encapsulating an IPSEC encrypted packet, or some other IP packet carrying an unencrypted payload).

In this embodiment, the COTM terminal 115 includes an ARQ unit (e.g., the ARQ unit 225 shown in FIG. 2) configured to encapsulate the received IP packet 440 to form an expanded IP packet 445 (or, in other embodiments, this may be some other network layer packet format). This expanded IP packet 445 contains a second outer IP header 450 with a field indicating that it is an ARQ packet and specifying the IP address (e.g., for an end user 275). The IP packet 445 also includes an ARQ header 455 (e.g., a 4 byte ARQ header) which may contain a sequence number, a timestamp, session number, and other information for error detection. The expanded IP packet 445 is then encapsulated in an HDLC header 460 (or other data link layer protocol), to form a data link layer HDLC packet 465. This packet is then transported, via the satellite, to the fixed terminal 110, which includes another ARQ unit (e.g., the ARQ unit 270 at the fixed terminal 110-b shown in FIG. 2). The fixed terminal 110 processes the IP header 450 for the expanded IP packet 445 and, recognizing that it is an ARQ packet, forwards it to an ARQ unit therein.

The ARQ unit at the fixed terminal 110 may then receive and process the ARQ header, and perform the ARQ error control processes at the IP layer. In this way, the ARQ processing units at the COTM terminal 115 and the fixed terminal 110 may perform the error control functionality at the IP layer via the satellite 105. The ARQ unit (e.g., ARQ unit 270) at the receiving fixed terminal 110 may respond with acknowledgement information (ACKs, NACKs, or other status reports) or session initiation responses transmitted at the network layer to the ARQ unit (e.g., ARQ unit 225) at the transmitting COTM terminal 115.

In this embodiment, the payload 440 need not be aware of the ARQ functionality. The data link layer (i.e., the HDLC layer) need not be aware of this functionality, either. The ARQ unit at the COTM terminal 115 may retransmit lost or damaged packets after receiving the appropriate ACKs or NACKs, if the delay limit (as applicable) is not exceeded given the applicable type of service. The ARQ unit (e.g., ARQ unit 225 or 270) may be configured to apply the additional IP layer (420, 424) only when a packet is destined for a terminal with an ARQ unit with IP layer functionality. In this embodiment, the COTM terminal 115 may maintain a different ARQ session for each traffic and/or QoS class at a given terminal, and may have ongoing ARQ sessions with a number of terminals at once.

Note that a format for a control packet 470 is illustrated as well, which may be sent on forward or reverse links. In other embodiments, the ARQ unit may be implemented in a box outside of the COTM terminal (e.g., between the HAIPE terminal and COTM terminal). In still other embodiments, the terminal to terminal link may be between fixed terminals 110, COTM terminals 115, or any alternative combination thereof.

Figure 4C:
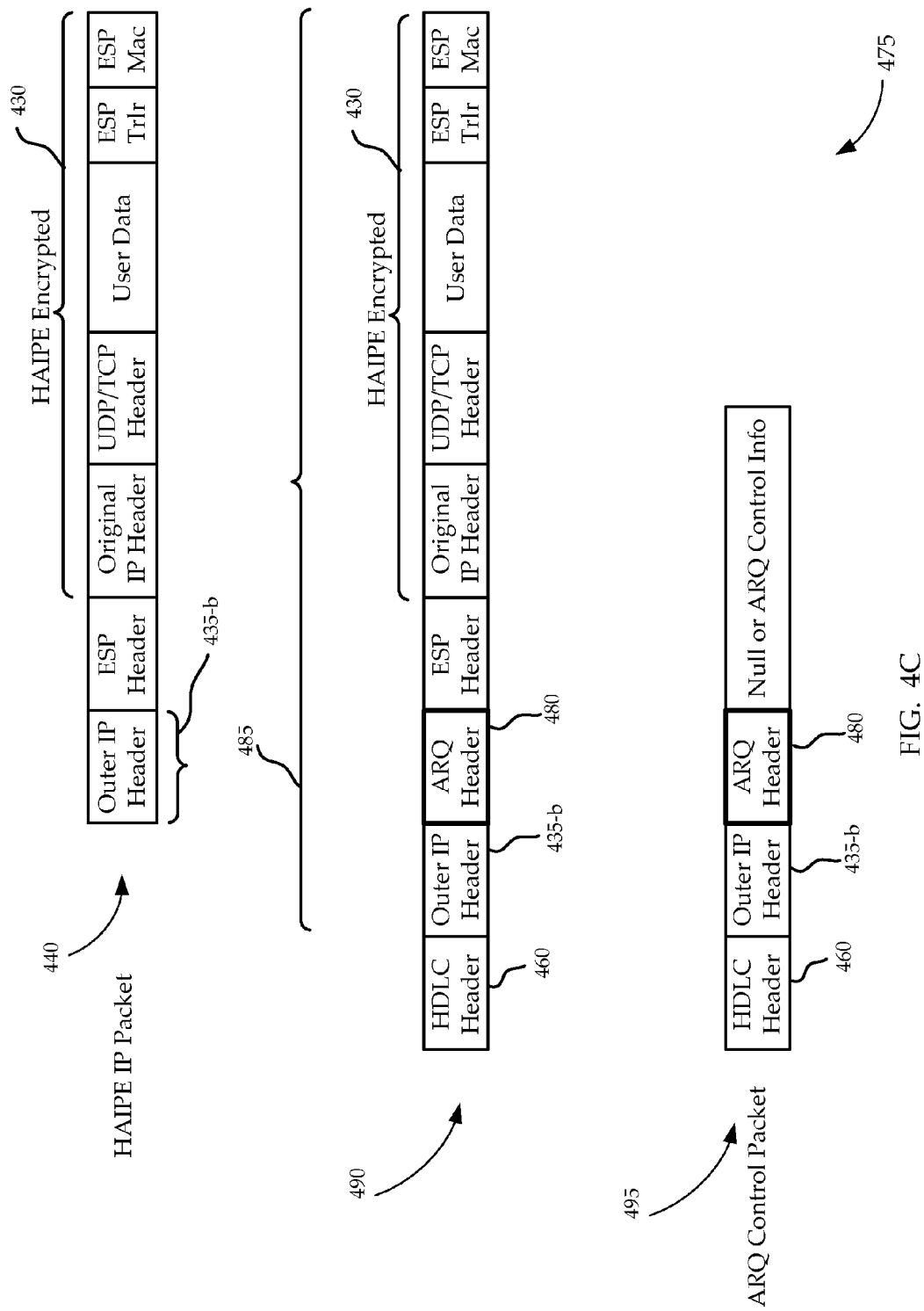
FIG. 4C is a block diagram illustrating an alternative example of the frame structure for certain error control transmissions at the network layer according to various embodiments of the invention.

Referring next to FIG. 4C, a block diagram is shown illustrating an alternative example of the frame structure 475 for various embodiments of the invention. This may, for example, be the frame format processed between terminals (e.g., the terminals 110, 115 set forth in FIG. 4A). Thus, in this embodiment, assume a COTM terminal 115 again receives a HAIPE encrypted IP packet 430 appended to an unencrypted IP header 435-b, thereby forming a payload made up of an IP packet 440 (again note that in other embodiments, other types of packets could be received or otherwise created at the COTM terminal 115 to form the payload, e.g., the payload could be an IP packet encapsulating an IPSEC encrypted packet, or some other IP packet carrying an unencrypted payload).

In this embodiment, the COTM terminal 115 includes an ARQ unit (e.g., ARQ unit 225 of FIG. 2) configured to insert or otherwise include an ARQ header 480 (e.g., a 4 byte ARQ header) between the unencrypted IP header 435-b and the ESP header. The ARQ header may contain a sequence number, a timestamp, session number, and other information for error detection. The expanded IP packet 485 is then encapsulated in a HDLC header 460 (or other data link layer protocol) to form a data link layer HDLC packet 490. This packet is then transported, via the satellite 105, to the fixed terminal 110, which includes another ARQ unit (e.g., the ARQ unit 270 shown in FIG. 2).

The fixed terminal 110 processes the IP header 435-b for the expanded IP packet 485 and, recognizing that it is an ARQ packet (because it is so indicated in the header), forwards it to its ARQ unit therein. The ARQ unit at the fixed terminal 110 may then receive and process the ARQ header, and perform the ARQ error control processes at the IP layer. Response or other acknowledgement packets may similarly be transported in the reverse direction at the IP layer, as well. In this way, the ARQ protocol described herein may operate in non-tunneled mode, and the ARQ overhead may be decreased from an extra 40 bytes (e.g., with IPv6) to an extra four bytes in this example.

Thus, in this embodiment, the encrypted payload 430 need not be aware of the ARQ functionality. The data link layer (i.e., the HDLC layer) need not be aware of this functionality, either. The ARQ unit at the COTM terminal 115 may retransmit lost or damaged packets after receiving the appropriate ACKs or NACKs, if the delay limit is not exceeded given the applicable type of service. An ARQ unit (e.g., ARQ unit 225 or 270) may be configured to insert the ARQ header 480 only when a packet is destined for a terminal with an ARQ unit with IP layer functionality. The COTM terminal 115 may again maintain a different ARQ session for each traffic and/or QoS class at a given terminal, and may have ongoing ARQ sessions with a number of terminals at once. Note that a format for a control packet 495 is illustrated as well, which may be sent on forward or reverse links.

Figure 5A:
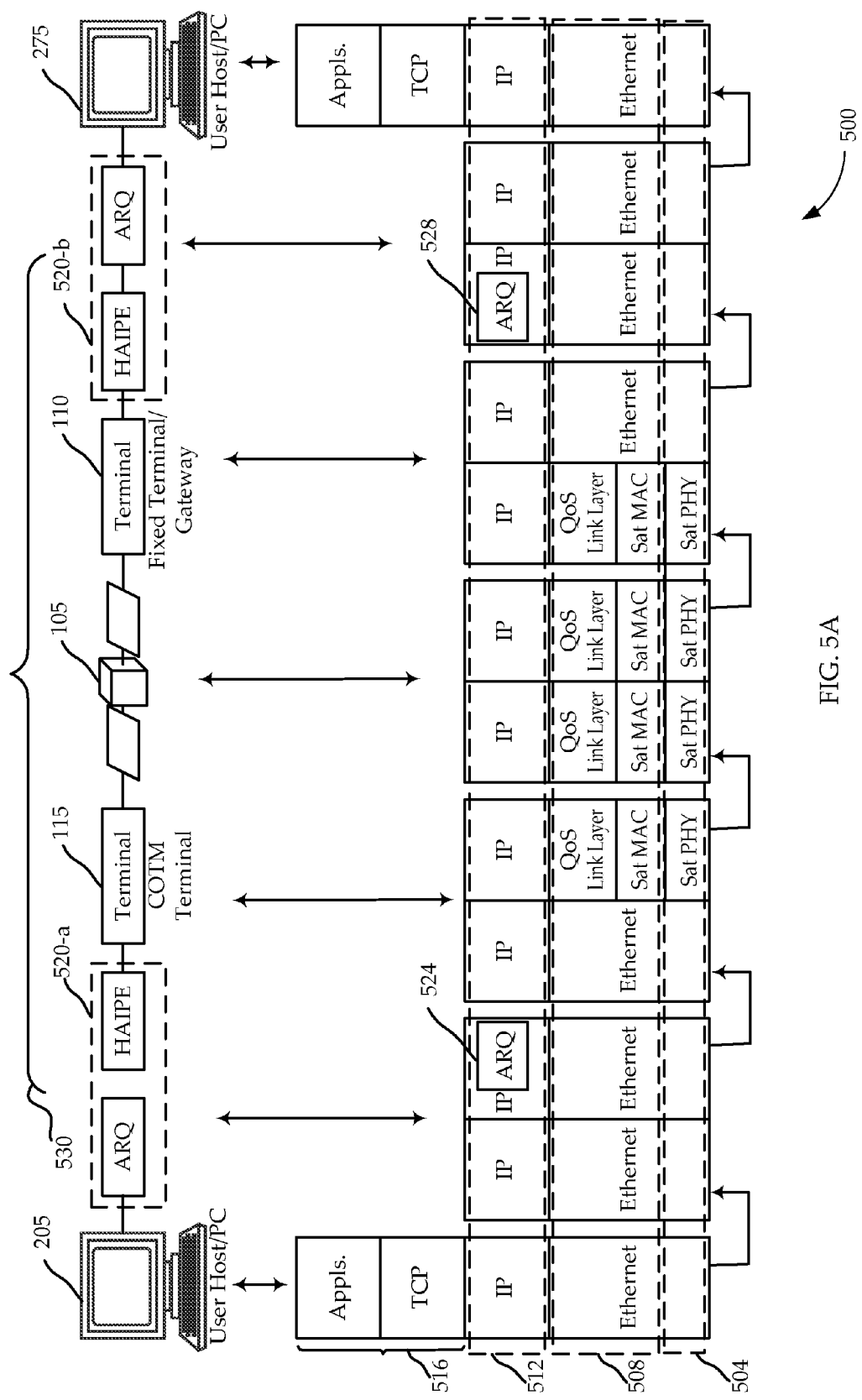
FIG. 5A is a block diagram illustrating an example of the protocol layering for certain packet formatting occurring between HAIPE terminals according to various embodiments of the invention.

Turning next to FIG. 5A, a block diagram is shown illustrating an example of certain packet formatting 500 which occurs on a series of links between two users 205, 275. An intermediate link 530 is illustrated. The communication passes from a user 205, through a HAIPE terminal 520-a (which includes an ARQ unit), a first intermediate terminal 115, a satellite 105, a second intermediate terminal 110, and then on through a second HAIPE terminal (which includes an ARQ unit) 520-b. FIG. 5A illustrates the physical layer 504, data link layer 508, network layer 512, and transport and application layer 516 processing that occurs at each device or set of devices. FIG. 5A illustrates how the ARQ error control frame may be created at the IP layer 524 by a HAIPE terminal 528 outside of the intermediate terminal-to-terminal connections described above, passing in encrypted form through the intermediate terminals and satellite, and be processed at the IP layer 528 of a receiving HAIPE terminal 520-b. In other embodiments, the illustrated packet formatting may take place with one, or more, other types of terminals outside of the terminal to satellite to terminal connections described above.

Figure 5B:
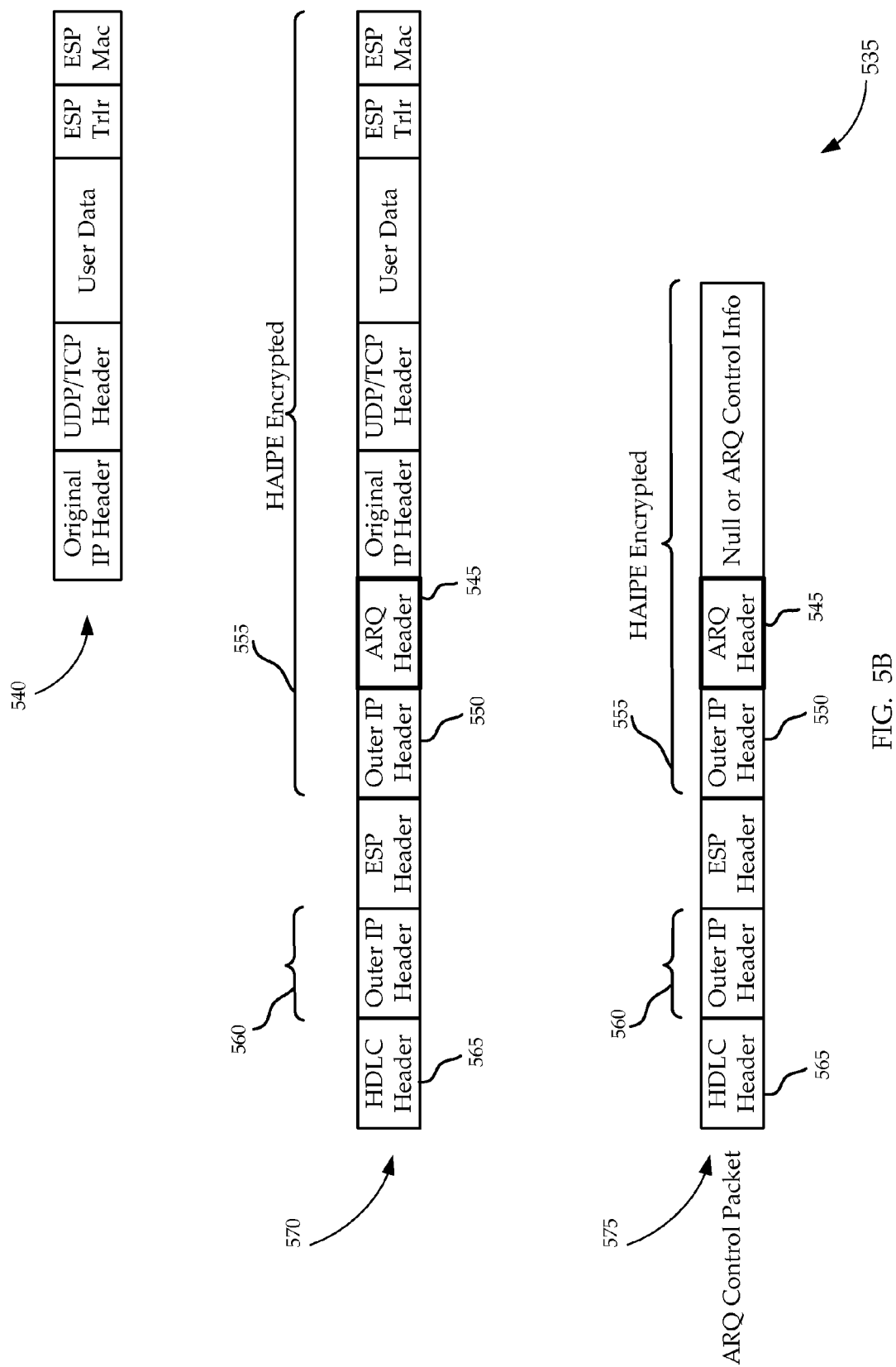
FIG. 5B is a block diagram illustrating an example of the frame structure for certain error control transmissions at the network layer between HAIPE terminals according to various embodiments of the invention.

Referring next to FIG. 5B, a block diagram is shown illustrating an example of a frame structure 535 for various embodiments of the invention. For purposes of example, assume that the terminals of FIG. 5A are in use. In this embodiment, a HAIPE terminal HAIPE terminal 524 receives an unencrypted IP packet 540. The HAIPE terminal 524 may evaluate the destination address of the received IP packet and recognize that it will be forwarded to a similar ARQ aware HAIPE terminal 528 (through the satellite 105). This lookup functionality could be achieved by having an ARQ unit in the HAIPE terminal maintain or otherwise access a table that lists certain IP or other addresses that are associated with ARQ units.

In this embodiment, the HAIPE terminal 520-a includes an ARQ unit configured to append or otherwise associate an ARQ header 545 (e.g., a 4 byte ARQ header) onto the IP packet 540. The ARQ header 545 may contain a sequence number, a timestamp, session number, and other information for error detection. The expanded packet is then encapsulated with an outer IP header 550 (or other network layer protocol), and encrypted to form an encrypted IP packet 555 with an encrypted ARQ header. The encrypted packet 555 is then encapsulated by an outer, unencrypted IP header 560. A data link layer header 565 is added, forming a data link layer packet 570 to be transported through the network with the payload 555 encrypted. This layering may be used on forward and reverse links. The intermediate terminals (fixed 110 and/or COTM 115) and satellite 105 need not be aware of the contents of the encrypted ARQ packet. The HAIPE terminal 520-b on the receiving end decrypts the packet 555, and recognizes that it is an ARQ packet (because the protocol value field therein so indicates). The HAIPE terminal forwards it to an ARQ unit therein. The ARQ unit at the HAIPE terminal 520-b may then receive and process the ARQ header, and perform the ARQ error control processes at the IP layer.

Thus, in this embodiment, the intermediate terminals need not be aware of the ARQ functionality. The ARQ unit at the transmitting HAIPE terminal 520-a may retransmit lost or damaged packets after receiving the appropriate ACKs, or NACKs from the receiving HAIPE terminal 520-b, if the delay limit is not exceeded given the applicable type of service. In this embodiment, the HAIPE terminal 520-a may maintain a different ARQ session for each traffic and/or QoS class at a given terminal, and may have ongoing ARQ sessions with a number of terminals at once.

Note that a format for a control packet 575 is illustrated as well, and it may be also sent on forward or reverse links. In other embodiments, the ARQ unit at a terminal may have a number of different sessions depending on the type of service or QoS features of the packet. Different types and qualities of service may be configured to have error control sessions at different terminals. In other embodiments, the HAIPE terminal-HAIPE terminal link may be between other terminals.

As noted above, ARQ units (e.g., the ARQ units (225, 270, 320) of FIGS. 2 and 3) or other processing units in a terminal may maintain tables that link destination IP addresses (or other destination addresses) with other ARQ units. For each ARQ unit in a table, there may be an additional correspondence with a particular session number or other identifier. Thus, as an IP packet (e.g., the IP packet 440 of FIG. 4B or 4C) is received at a terminal with an ARQ unit (e.g., the ARQ unit 225 at COTM terminal 115-b of FIG. 2), a table may be accessed to identify a receiving ARQ unit corresponding to the destination IP address. A Type of Service field in the received IP packet may be accessed, and this field may be used to identify the appropriate session for the IP packet. The transmitting ARQ unit may append an outer IP header (e.g., IP header 550) and an ARQ header (e.g., 545) at the network layer, thereby encapsulating the received IP packet. A session identifier, sequence number, and other error control information may be included in the ARQ header, and the packet may thus be transmitted to the receiving ARQ unit at the IP layer. Between terminals, there may be a single session for all transmitting and receiving users. Alternatively, there may be a number of sessions, depending on type or quality of service, source or destination IP or other address, or other factors.

Figure 6:
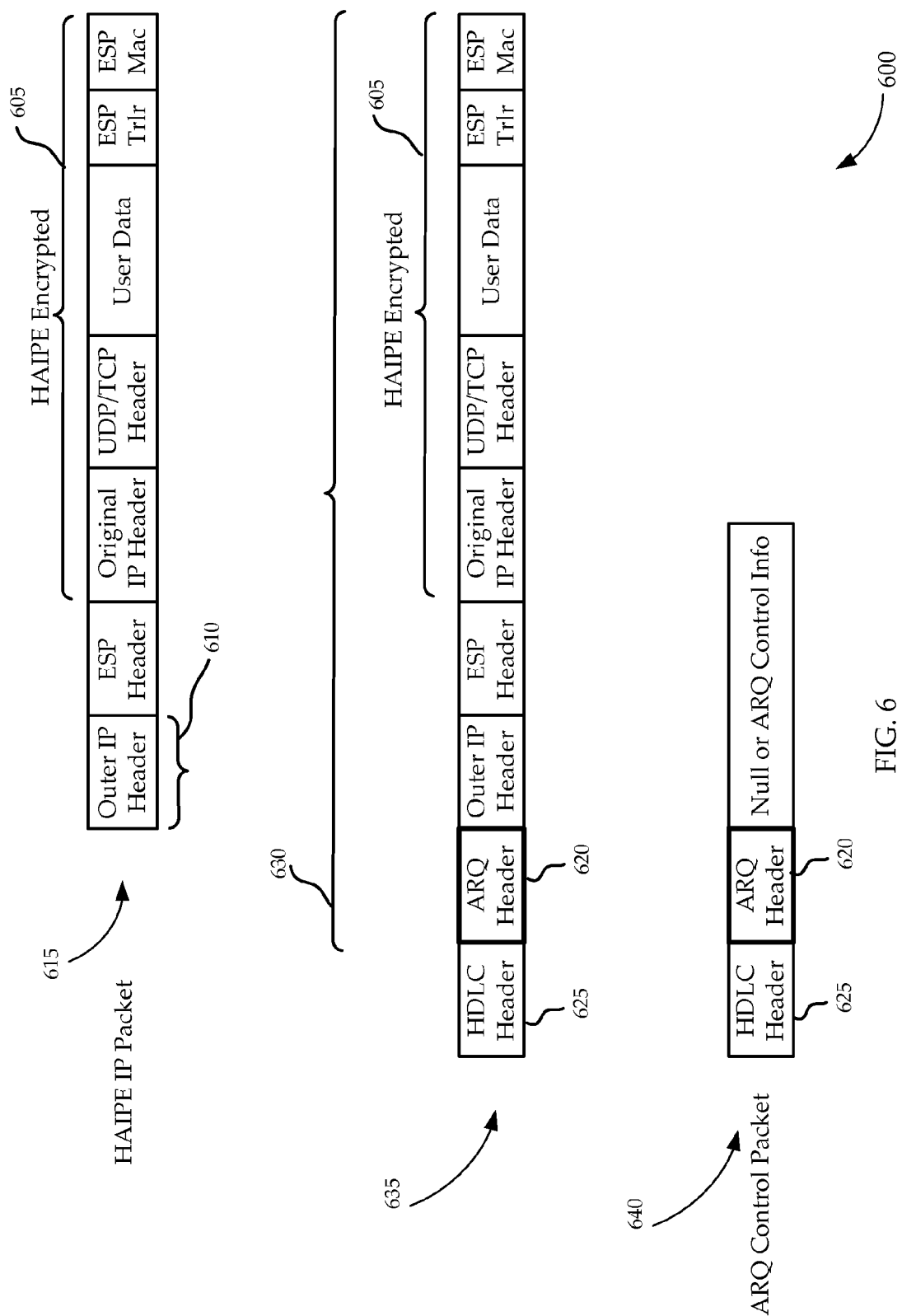
FIG. 6 is a block diagram illustrating an example of the frame structure for certain error control transmissions between the network layer and the data link layer according to various embodiments of the invention.

Referring next to FIG. 6, a block diagram is shown illustrating an example of the frame structure 600 for various embodiments of the invention. This may, for example, be the frame format processed at the satellite 105, as set forth in FIG. 3 (or used in the reverse direction). Thus, in this embodiment, a satellite 105 may receive a HAIPE encrypted IP packet 605 encapsulated by an unencrypted IP header 610, thereby forming a payload made up of an IP packet 615 (note that in other embodiments, other types of packets could be received or otherwise created at the satellite to form the payload, e.g., the payload could be an IP packet encapsulating an IPSEC encrypted packet, or some other IP packet carrying an unencrypted payload).

In this embodiment, the satellite 105 includes an ARQ unit (e.g., the ARQ unit 320 shown in FIG. 3) configured to append or otherwise include an ARQ header 620 (e.g., a 4 byte ARQ header) onto the IP packet 615. The ARQ header 620 may contain a sequence number, a timestamp, a session number, delay and/or time limits, and other information for error detection. The expanded packet 630 is then encapsulated in a HDLC header 625 (or other data link layer protocol) to form a data link layer HDLC packet 635. This packet is then transported to the terminal 110, 115, which includes another ARQ unit (e.g., the ARQ unit 320 at the COTM terminal 115-c shown in FIG. 3). The COTM terminal 115-c processes the HDLC header for the packet 635, recognizing that it is an ARQ packet (because the protocol value field therein so indicates), and forwards it to the ARQ unit. The ARQ unit at the COTM terminal 115-c may then receive and process the ARQ header, and perform the ARQ error control processes at the IP layer.

Thus, in this embodiment, the payload 615 need not be aware of the ARQ functionality. The ARQ unit at the satellite may retransmit lost or damaged packets after receiving the appropriate ACKs or NACKs, if the delay limit is not exceeded given the applicable type of service. The ARQ unit may be configured to apply the ARQ header 620 only when a packet is destined for a terminal with an ARQ unit with IP layer functionality. In this embodiment, the satellite 105 may maintain a different ARQ session for each traffic and/or QoS class at a given terminal, and may have ongoing ARQ sessions with a number of terminals at once.

Note that a format for a control packet 640 is illustrated as well, and it may be sent on forward or reverse links. In other embodiments, the ARQ unit may be implemented in a box outside of the terminal (e.g., between the HAIPE terminal and COTM terminal 115). Although the above description is directed at the link from a satellite 105 to a COTM terminal 115, the session at issue may also be from the COTM terminal 115 to the satellite 105, wherein the ARQ header formatting is applied at the COTM terminal 115, and then received and processed at the satellite 105. According to the embodiment described with reference to FIG. 3, the satellite 105 may, therefore, operate as a receiver and transmitter for the same IP packet (e.g., with a COTM terminal 115-a to satellite 105 link, and then from the satellite 105 to COTM terminal 115-b link). In other embodiments, the satellite/terminal link may be between a satellite and a fixed terminal as well.

Figure 7A:
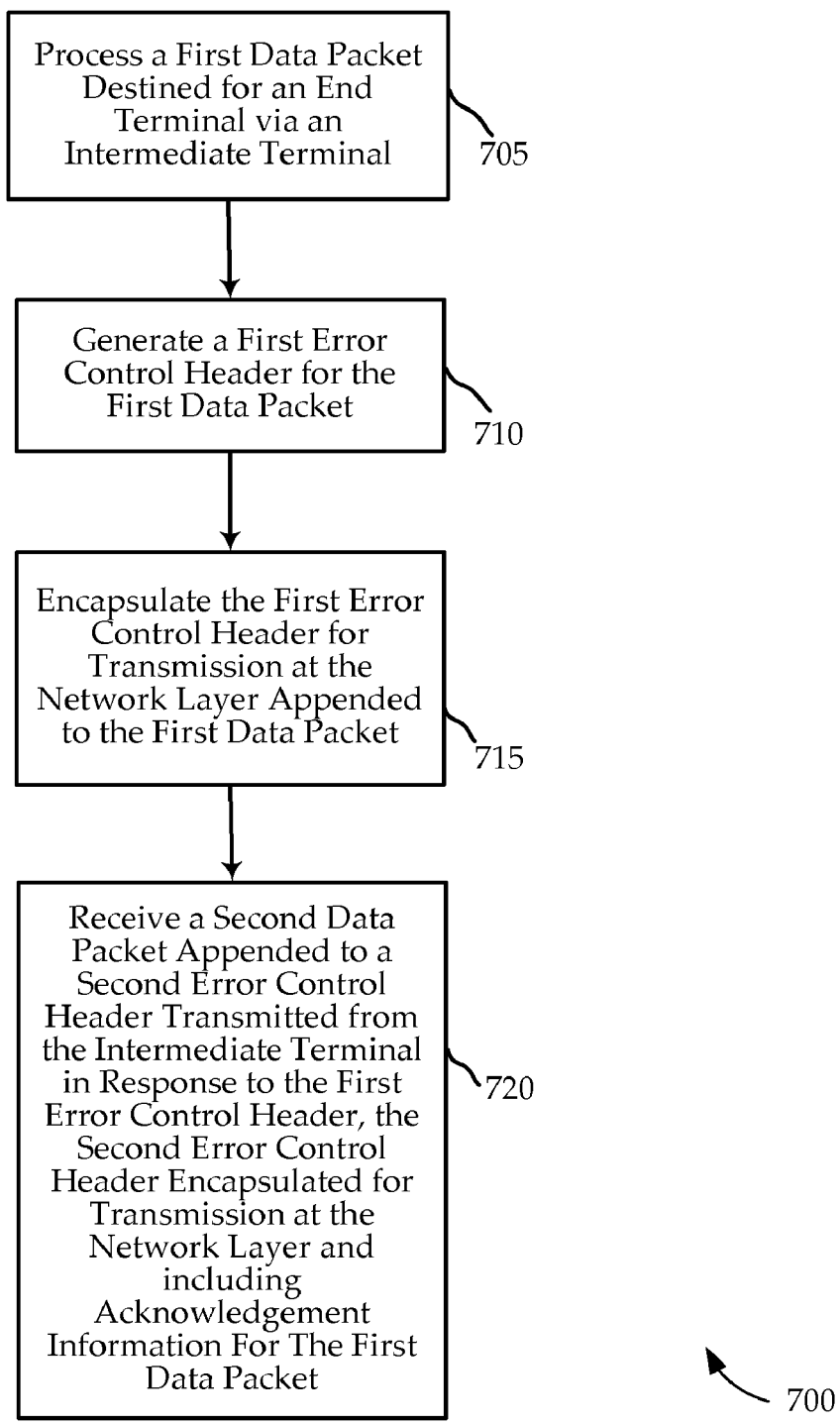
FIG. 7A is a flowchart illustrating a method of transmitting error control information to a receiving terminal according to various embodiments of the invention.

FIG. 7A is a flowchart illustrating a method 700 of transmitting error control information to a receiving terminal according to various embodiments of the invention. The method 700 may, for example, be performed in whole or in part by the COTM terminal 115, the fixed terminal 110, or the satellite 105 of FIG. 1, 2, or 3.

At block 705, a first data packet is processed, the first data packet destined for an end terminal via an intermediate terminal. At block 710, a first error control header is generated for the first data packet. At block 715, the first error control header is encapsulated for transmission at the network layer appended to the first data packet. At block 720, a second data packet appended to a second error control header is received, the second data packet and appended second error control header transmitted from the intermediate terminal in response to the first error control header. The second error control header is encapsulated for transmission at the network layer, and includes acknowledgement information for receipt of the first data packet.

Figure 7B:
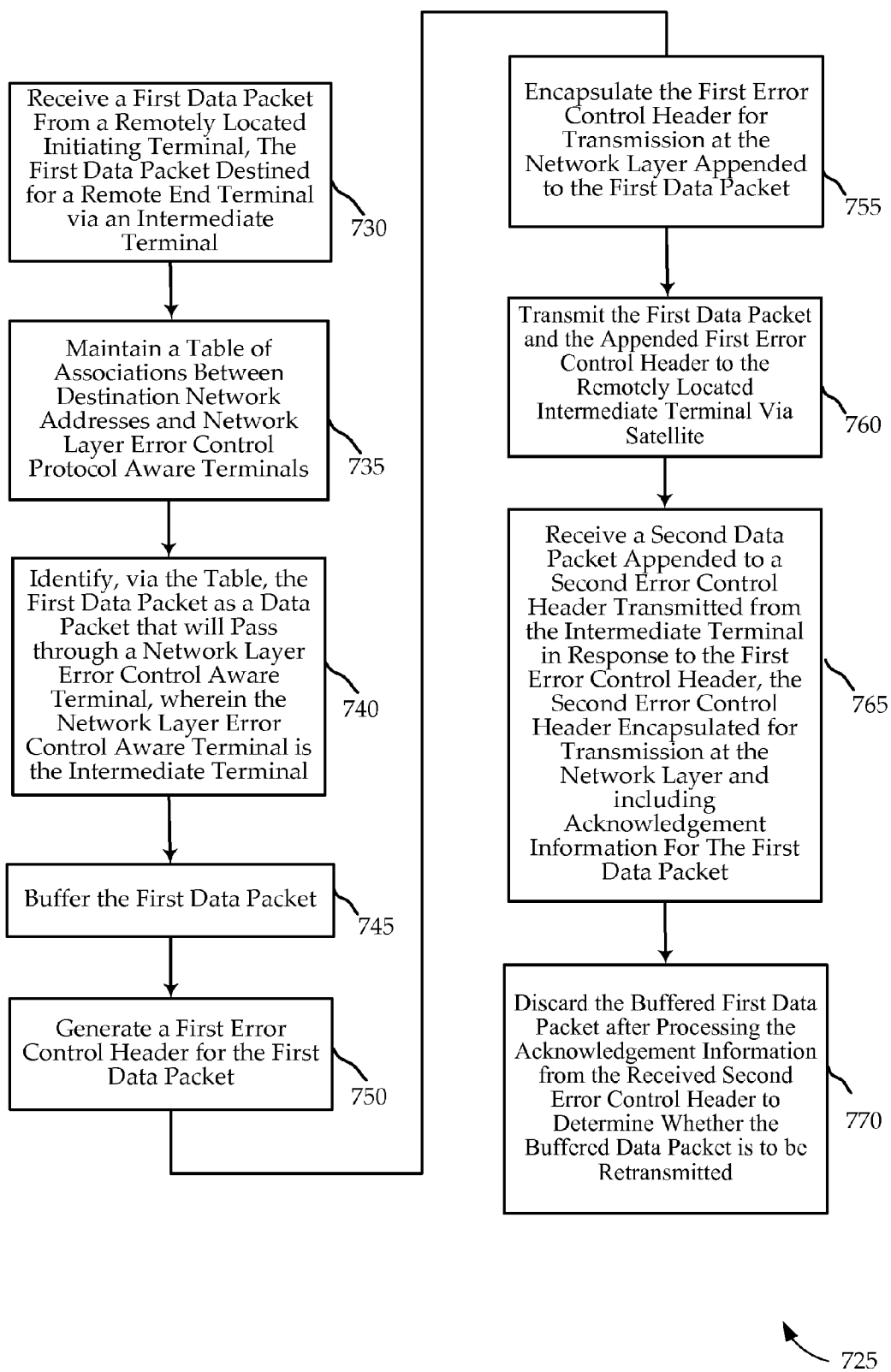
FIG. 7B is a flowchart illustrating a method of transmitting error control information and managing associated buffers according to various embodiments of the invention.

FIG. 7B is a flowchart illustrating a method 725 of transmitting error control information and managing associated buffers according to various embodiments of the invention. The method 700 may, for example, be performed in whole or in part by the COTM terminal 115, the fixed terminal 110, or the satellite 105 of FIG. 1, 2, or 3.

At block 730, a first data packet is received from a remotely located initiating terminal, the first data packet destined for a remote end terminal via an intermediate terminal. At block 735, a table of associations is maintained, the associations relating destination network addresses to network layer error control protocol-aware terminals. At block 740, the first data packet is identified, via the table, as a data packet that will pass through a network layer error control aware terminal, wherein the network layer error control aware terminal is the intermediate terminal.

At block 745, the first data packet is buffered. At block 750, a first error control header is generated for the first data packet. At block 755, the first error control header is encapsulated for transmission at the network layer appended to the first data packet. At block 760, the first data packet and appended first error control header are transmitted to the remotely located intermediate terminal via satellite.

At block 765, a second data packet and appended second error control header are received, the second data packet and appended second error control header transmitted from the intermediate terminal in response to the first error control header. The second error control header is encapsulated for transmission at the network layer, and includes acknowledgement information for the first data packet. At block 770, the buffered first data packet is discarded after processing the acknowledgement information from the received second error control header to determine whether the buffered data packet is to be retransmitted.

Figure 8A:
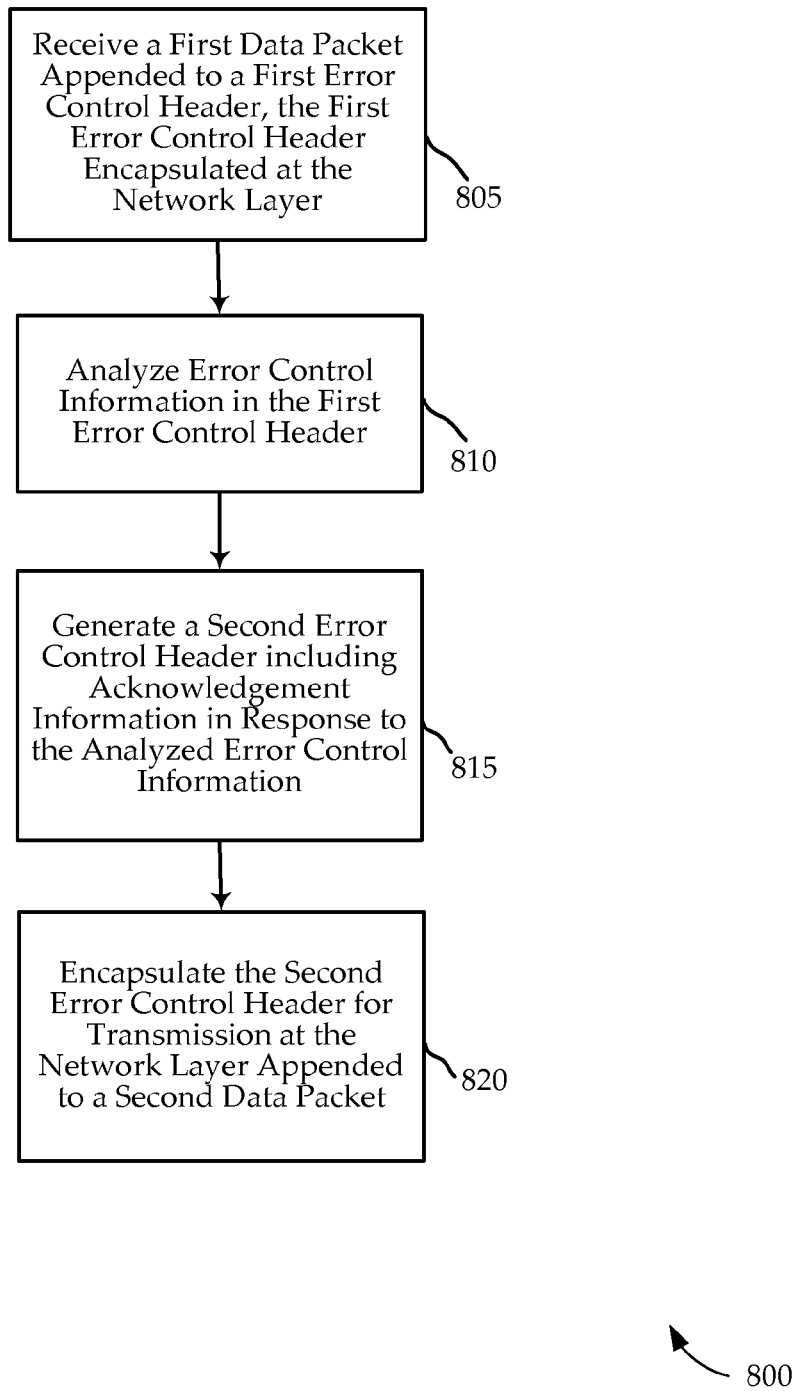
FIG. 8A is a flowchart illustrating a method of receiving and responding to error control information from a transmitting terminal according to various embodiments of the invention.

FIG. 8A is a flowchart illustrating a method 800 of receiving error control information from a transmitting terminal according to various embodiments of the invention. The method 800 may, for example, be performed in whole or in part by the COTM terminal 115, the fixed terminal 110, or the satellite 105 of FIG. 1, 2, or 3.

At block 805, a first data packet and appended first error control header are received, the first error control header encapsulated at the network layer. At block 810, error control information in the first error control header is analyzed. At block 815, a second error control header is generated including acknowledgement information in response to the analyzed error control information. At block 820, the second error control header is encapsulated for transmission at the network layer appended to a second data packet.

Figure 8B:
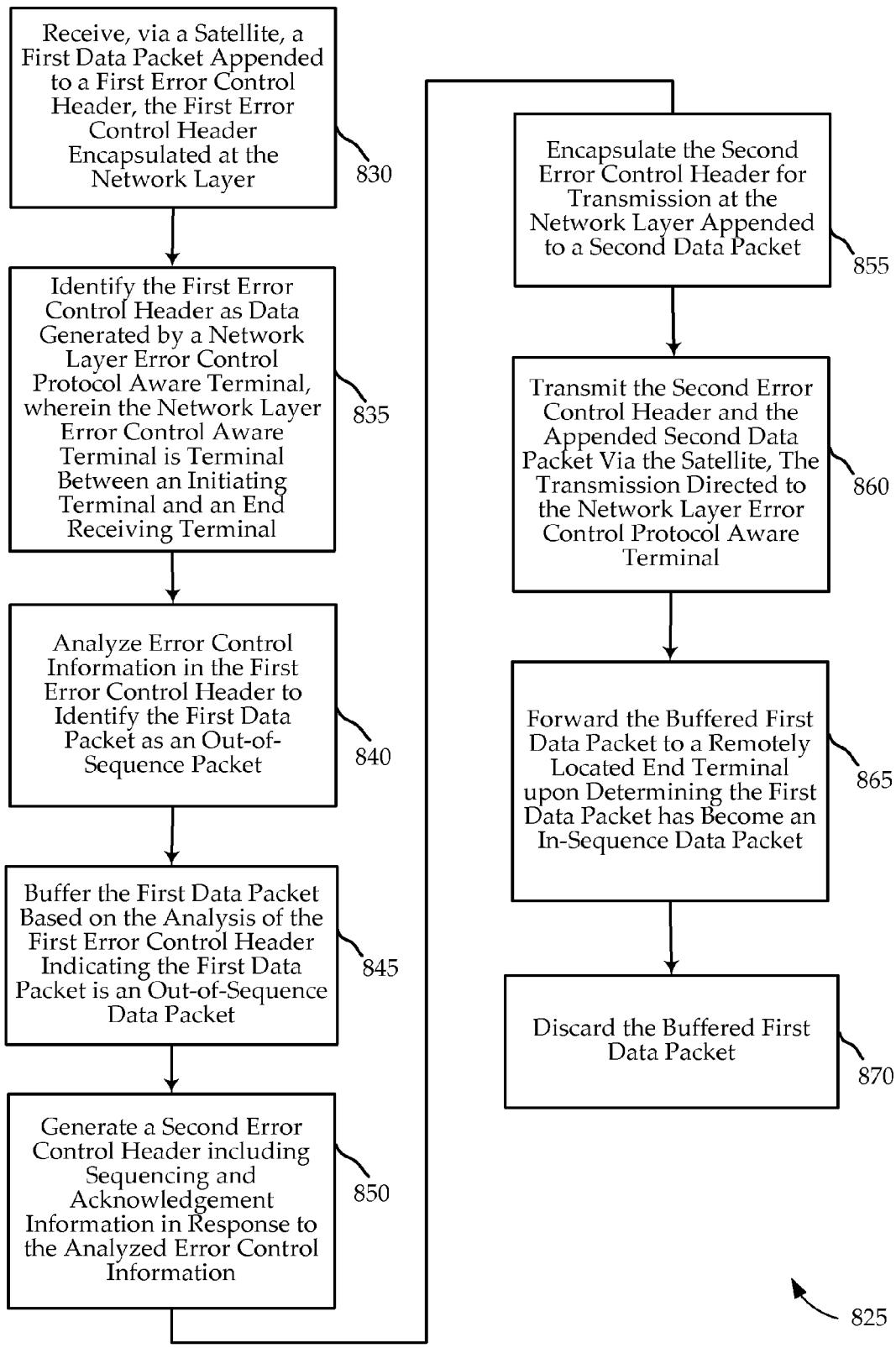
FIG. 8B is a flowchart illustrating a method of receiving and responding to error control information and managing associated buffers according to various embodiments of the invention.

FIG. 8B is a flowchart illustrating a method 825 of receiving and responding to error control information and managing associated buffers according to various embodiments of the invention. The method 825 may, for example, be performed in whole or in part by the COTM terminal 115, the fixed terminal 110, or the satellite 105 of FIG. 1, 2, or 3.

At block 830, a first data packet appended to a first error control header is received via satellite, the first error control header encapsulated at the network layer. At block 835, the first error control header is identified as data generated by a network layer error control protocol-aware terminal, wherein the network layer error control aware terminal is a terminal between an initiating terminal and an end receiving terminal. At block 840, error control information in the first error control header is analyzed to identify the first data packet as an out-of-sequence packet.

At block 845, the first data packet is buffered based on the analysis of the first error control header indicating the first data packet is an out-of-sequence data packet. At block 850, a second error control header including sequencing and acknowledgement information (e.g., identifying received and missing packets) is generated in response to the analyzed error control information. At block 855, the second error control header is encapsulated for transmission at the network layer appended to a second data packet. At block 860, the second error control header and the appended second data packet are transmitted, via the satellite, the transmission directed to the network layer error control protocol-aware terminal.

At block 865, the buffered first data packet is forwarded to a remotely located end terminal upon determining the first data packet has become an in-sequence data packet. In other embodiments, the forwarding may occur after a buffering time expires or before a buffering time is set to expire. At block 870, the buffered first data packet is discarded after it is forwarded.

Turning to another set of embodiments, various methods, systems, and software for discovering error control protocol-aware terminals are described. A transmitting terminal with an ARQ unit typically receives a data packet with a destination network address. Referring back briefly to FIG. 2, recall that the routing unit 220 may evaluate the destination network address of the received data packet to determine whether it will be forwarded to a similar ARQ-aware fixed terminal 110-b (e.g., through the satellite 105 via link 120-c). This lookup functionality may be achieved by maintaining a listing of associations between each of a number of destination network addresses and one or more error control protocol-aware terminals. The routing unit 220 of FIG. 2, for example, may maintain or otherwise access a table in a memory that lists certain destination network addresses that are associated with ARQ units.

Figure 9:
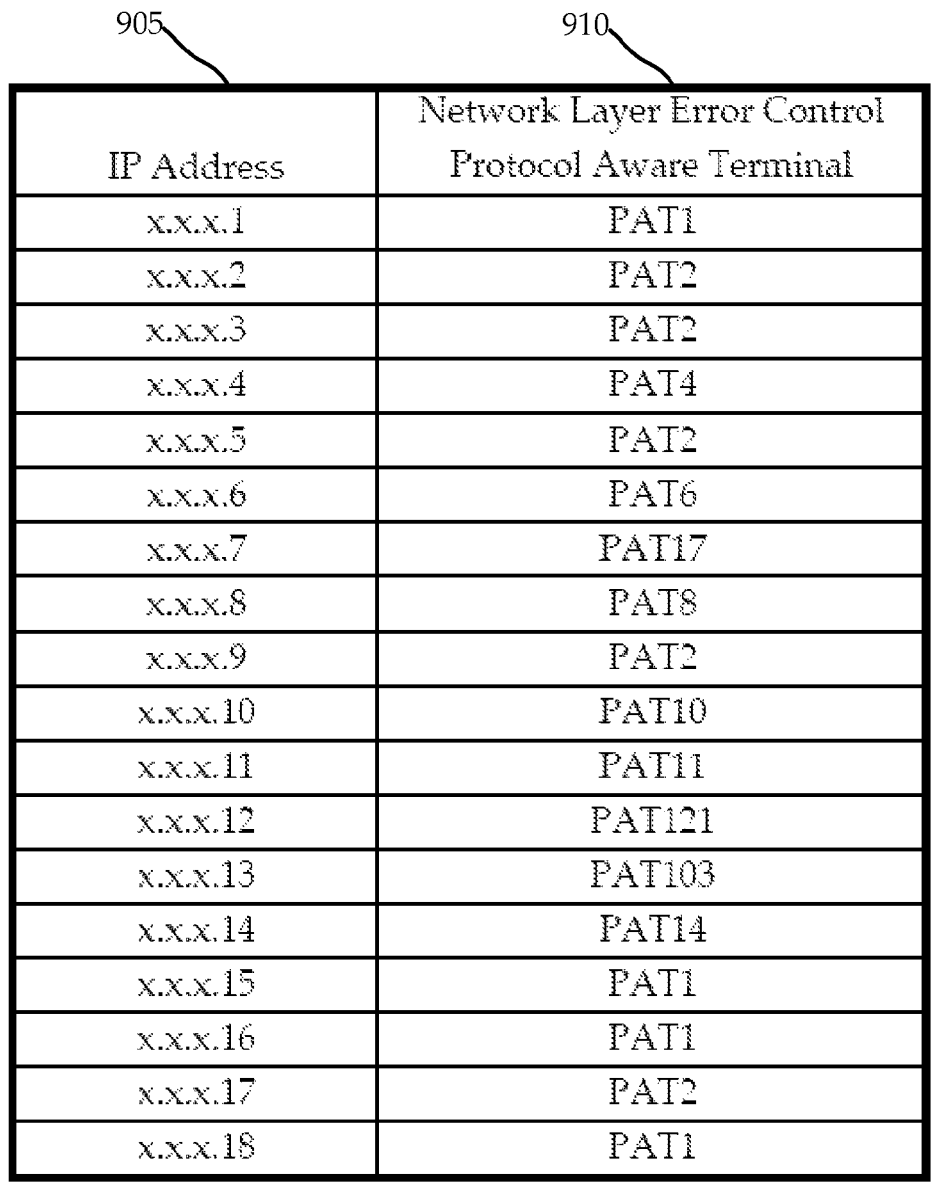
FIG. 9 is a block diagram illustrating a table associating destination network addresses with error control terminals according to various embodiments of the invention.

Referring next to FIG. 9, an example of such a table 900 is shown, associating IP addresses with network layer error control protocol-aware terminal. The left column lists a number of destination IP addresses 905, while the right column sets forth the network layer error control protocol-aware terminals 910 associated with each listed IP address. This type of table 900 may, for example, be used when an error control protocol-aware terminal (e.g., a fixed terminal 110 or COTM terminal 115 of FIG. 1 or 2) is deciding whether to perform the ARQ error control processing described herein.

The transmitting terminal may not be aware of the correspondence between the destination network address and the particular receiving terminal (and associated ARQ unit). The transmitting terminal may send a probe packet with a probe packet identifier to the destination IP address to discover such a terminal, and the receiving terminal captures the probe based on the identifier. The receiving terminal responds, and the ARQ table for each terminal is updated. Methods and systems are also described for updating ARQ tables. When users move between terminals, the ARQ tables in the terminals identifying their location may be updated to allow continued error control between terminals in a dynamic environment.

Figure 10:
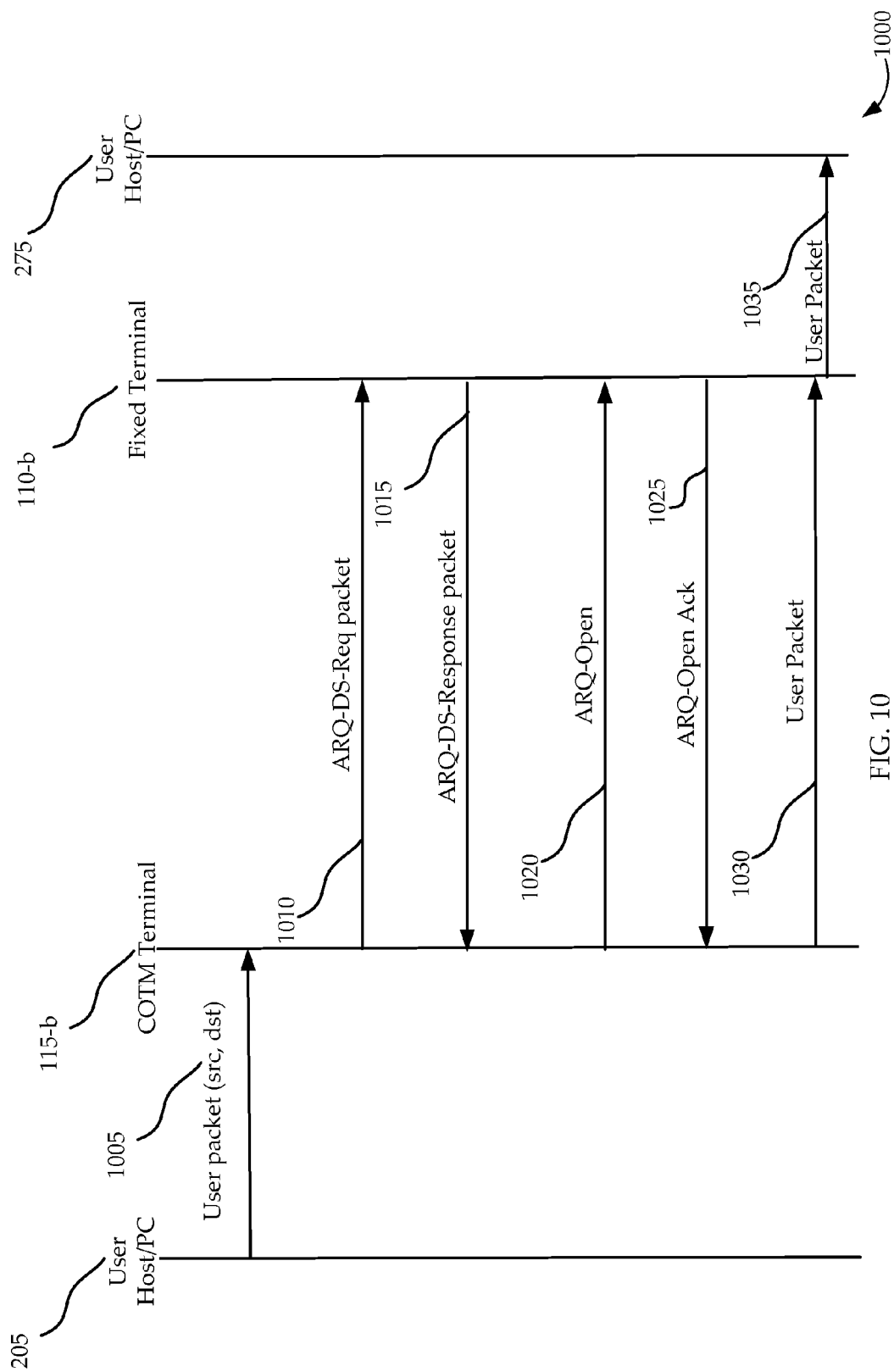
FIG. 10 is packet flow diagram illustrating a terminal discovery process between two terminals according to various embodiments of the invention.

Those skilled in the art recognize the dynamic nature of many IP addresses and end users. End users may move between terminals, and terminals may have incomplete information about all IP addresses. Therefore, an example of a process will be described to discover ARQ units associated with destination IP addresses (or other addresses). FIG. 10 is a packet flow diagram 1000 illustrating an example flow of packets between the COTM terminal 115-b and fixed terminal 110-b of FIGS. 1 and 2, according to an embodiment of the invention. In other embodiments, the discovery process may occur between other error control protocol-aware terminals or nodes in a network.

The COTM terminal 115-b receives a user packet 1005 with a source and destination IP address from a user 205. The COTM terminal 115-b accesses a table (e.g., accessing table 900 of FIG. 9 using ARQ unit 225 of FIG. 2) to determine whether there is a terminal (and possibly session identifier) that is associated with the destination IP address. Not finding such an entry, the COTM terminal 115-b formats and forwards a probe packet 1010 (referred to as an ARQ-DS-REQ packet in FIG. 10). This packet 1010 may, for example, be formatted as the ARQ packet 445 or control packet 470 of FIG. 4B, with the destination IP address the same as the destination IP address of the received user packet 1005. There is an indicator in the probe IP packet 1010 that it is a probe packet (or more generally, an ARQ packet), and this indicator may be in the "Next Protocol Field" of the probe IP packet 1010 (this indicator, therefore, may be referred to herein as an "identifier" or "probe packet identifier"). This identifier is formatted to allow a next error control protocol-aware terminal to identify and capture terminal information in the probe packet 1010.

The COTM terminal 115-*b* may also forward the received user packet 1005 (without the error control processes described herein). It may also hold the received user packet 1005 in a buffer until the listing is updated with a receiving terminal entry for the destination network address, or until an ARQ session is established. Alternatively, the probe packet 1010 may be configured to carry the IP packet 1005 as its payload, and thus the probe packet 1010 may include the user packet 1005.

At the fixed terminal 110-*b* (which includes an ARQ unit, for example ARQ unit 270 of FIG. 2), the probe packet 1010 is received, and may be captured based on the identifier. The probe packet 1010 is processed, and the fixed terminal 110-*b* recognizes the packet as a probe packet, identifying the source IP address and the COTM terminal 115-*b*. The fixed terminal 110-*b* may then update its own ARQ table, thereby associating the source IP address with the COTM terminal 115-*b*. The fixed terminal formats and transmits a response packet 1015 (referred to as an ARQ-DS-Response packet in FIG. 10). This packet 1015 may be formatted as the ARQ packet 445 or 485 or control packet 470 or 495 of FIG. 4B or 4C (with the destination IP address the same as the source IP address of the received IP packet 1005, or perhaps the IP address of the COTM terminal 115-*b*). There is another identifier in the response packet 1015 that it is a response packet, and this indicator may be in the "Next Protocol Field" of the response packet 1015.

The COTM terminal 115-*b* then receives the response packet 1015, and updates its ARQ table to associate the fixed terminal 110-*b* with the destination IP address of the IP packet 1005. The COTM terminal 115-*b* (perhaps with its ARQ unit) may then access a table to determine whether there is a session corresponding to the COTM terminal 115-*b* to fixed terminal 110-*b* link, and whether that session may be applicable to the type or quality of service associated with an IP packet to be sent to over the link.

If an applicable ARQ session entry is not found for an IP packet to be sent over the link, the COTM terminal 115-*b* formats and forwards a session establishment IP packet 1020 (referred to as an ARQ-Open packet in FIG. 10). This packet 1020 may be formatted as the ARQ packet 445 or 485 or control packet 470 or 490 of FIG. 4B or 4C, with the destination IP address the same as the destination IP address of the user packet 1005 or the fixed terminal 110-*b*. The fixed terminal 110-*b* may then receive the session establishment packet 1020, and create a session entry associated with the content classification of the data packet (e.g., based on whether the user packet is audio or video, streaming or interactive, and on quality of service requirements, or other). The fixed terminal 110-*b* formats and forwards a session ACK packet 1025 (referred to as an ARQ-Open Ack packet in FIG. 10). This packet 1025 may, as above, be formatted as the ARQ packet or ARQ control packet (with the destination IP address the same as the source IP address of the user packet 1005, or perhaps the IP address of the COTM terminal 115-*b*). There is another identifier in the session ACK packet 1025 that it is a session initiation packet. The COTM terminal 115-*b* receives and processes the session ACK packet 1025, and the session is thereby established.

If it has not done so already, the COTM terminal 115-*b* may transmit the buffered data packet 1030 with appended error control data along the routing path toward the destination network address. The transmitted error control data may include a sequence number and an identifier to allow the fixed terminal 110-*b* to capture the error control data. The data packet may be integrated into the probe packet 1010, or may be received separately by the by fixed terminal 110-*b*. The data packet will, regardless of how it is received, be transmitted 1035 to the end terminal 275. The fixed terminal 110-*b* may further respond by transmitting acknowledgement information back to the COTM terminal 115-*b*, and the acknowledgement information may include the sequence number.

Figure 11A:
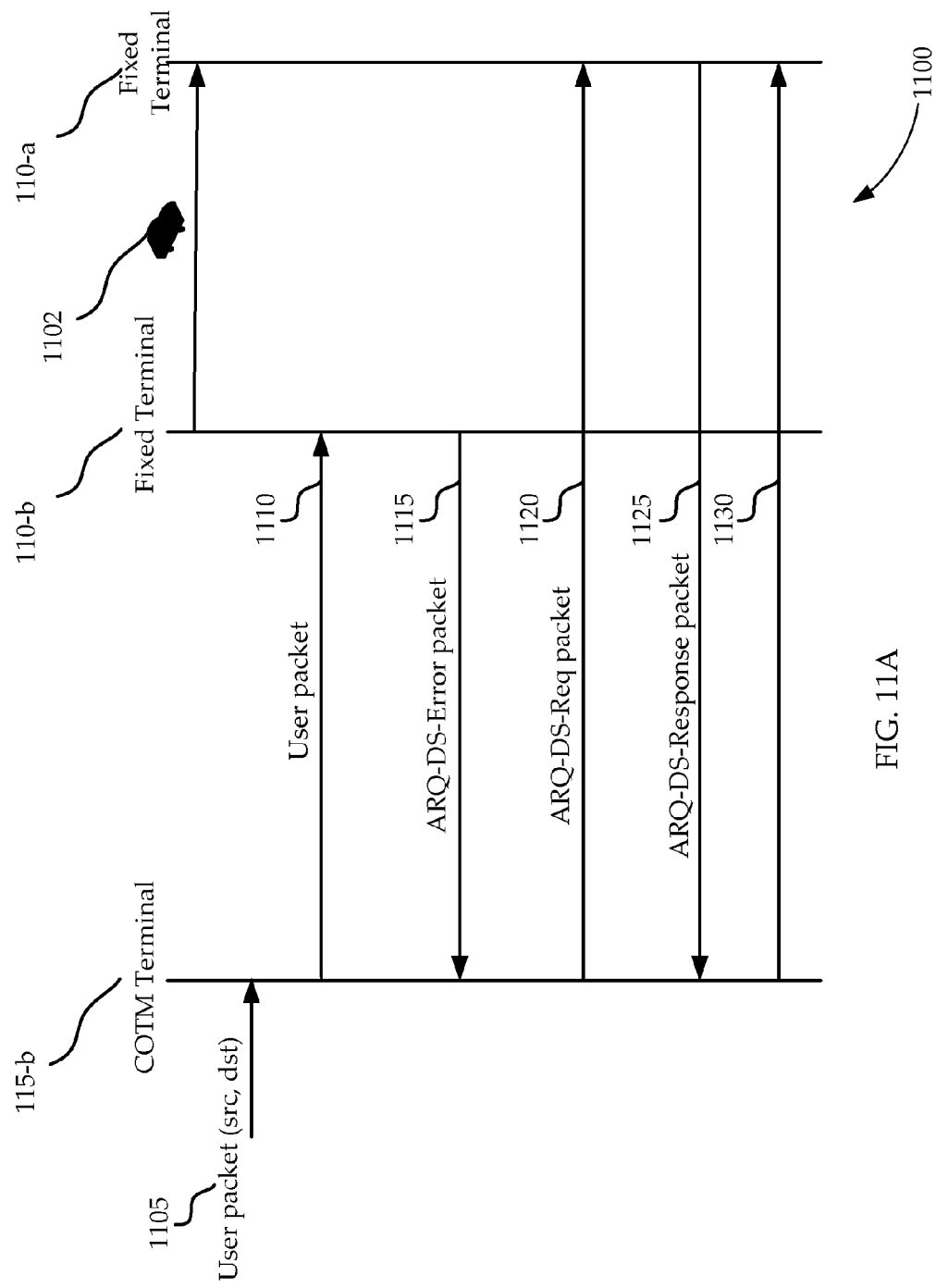
FIG. 11A is packet flow diagram illustrating a terminal discovery process for a mobile host environment according to various embodiments of the invention.

As noted above, many hosts and terminals in such a system may be mobile or otherwise dynamic, and thus it may be desirable to address the host mobility issue. As noted above, ARQ units (e.g., the ARQ units (225, 265, 305, 320) of FIGS. 2 and 3) or other processing units in a terminal may maintain tables (e.g., table 900 of FIG. 9) that link destination IP addresses (or other destination addresses) with other ARQ units. Consider, however, the movement of a user from a first terminal to a second terminal. FIG. 11A is a packet flow diagram 1100 illustrating the flow of packets between the COTM terminal 115-*b* a first fixed terminal 110-*b*, and a second fixed terminal 110-*a* of FIG. 1A, according to an embodiment of the invention. In other embodiments, the host mobility process may occur between other terminals or nodes in a network.

The COTM terminal 115-*b* receives a user packet 1105 with a source and destination IP address. The COTM terminal 115-*b* accesses a table (e.g., table 900 of FIG. 9 using ARQ unit 225 of FIG. 2) to determine whether there is a terminal (and possibly session identifier) that is associated with the destination IP address and packet type. Finding such an entry, the COTM terminal 115-*b* formats and forwards a modified user packet 1110 (e.g., as an ARQ IP packet 445 of FIG. 4B with the user packet 1105 as payload).

At the fixed terminal 110-*b* (which includes an ARQ unit, for example ARQ unit 270 of FIG. 2), the ARQ IP packet 1110 is received. The ARQ IP packet 1110 is processed, and the fixed terminal 110-*b* recognizes the packet as an ARQ packet. The fixed terminal 110-*b* determines that the destination host (of user packet 1105) is no longer accessible (e.g., by accessing its own ARQ table, or otherwise receiving data indicating no reachability). this may be because the host moved 1102 to a second fixed terminal 110-*a*. The fixed terminal 110-*b* may update its own ARQ table if necessary (associating the COTM terminal 115-*b* with the source IP address), and format and transmit an error packet 1115 (referred to as an ARQ-DS-Error packet in FIG. 11A). This packet 1115 may be formatted as the control packet 470 of FIG. 4B (with the destination IP address the same as the source IP address of the user packet 1105, or perhaps the IP address of the COTM terminal 115-*b*). There is an identifier in the error packet 1115 that it is an ARQ packet (or more specifically an error packet), and this indicator may be in the "Next Protocol Field" of the error packet 1115.

The COTM terminal 115-*b* then receives the error packet 1115, and updates its ARQ table to end the association of the fixed terminal 110-*b* with the destination IP address of the IP packet 605. The COTM terminal 115-*b* formats and forwards a probe IP packet 1120 (referred to as an ARQ-DS-REQ packet in FIG. 11A, and equivalent to packet 1010 of FIG. 10). This packet 1120 may be formatted as the ARQ IP packet or ARQ control packet FIG. 4B or 4C, for example, with the destination IP address the same as the destination IP address of the originally received user packet 1105. However, there is an identifier in the probe IP packet 1120 that it is a probe packet (or simply that it is an ARQ packet), and this indicator may be in the "Next Protocol Field" of the probe IP packet 1120. The COTM terminal 115-*b* may also forward the received IP packet 1105 that has been buffered, or continue to hold it in a buffer until an ARQ session is established (alternatively, the probe packet 1120 might be configured to carry the IP packet 1105 as its payload). Other methods may be used to retransmit the originally received IP packet 1105, as well, perhaps depending on an applicable delay limit.

At the second fixed terminal 110-*a* (which includes an ARQ unit, for example ARQ unit 225 of FIG. 2), the probe IP packet 1120 is captured. The probe IP packet is processed, and the fixed terminal 110-*a* recognizes the packet as an ARQ packet (or, possibly as an ARQ control packet) with a destination IP address for one of its reachable users. The fixed terminal 110-*a* may then update its own ARQ table (e.g., table 900 of FIG. 9), thereby associating the source IP address with the COTM terminal 115-*b*. The fixed terminal 110-*a* formats and forwards a response packet 1125 (referred to as an ARQ-DS-Response packet in FIG. 11A). This packet 1125 may be formatted as the ARQ packet 445 or 485 or control packet 470 or 490 of FIG. 4B or 4C (with the destination IP address the same as the source IP address of the received IP packet 1105, or perhaps the IP address of the COTM terminal 115-*b*). There is indicator that it is a response packet or, more generally, an ARQ packet, and this may be in the "Next Protocol Field" of the response packet 1125.

The COTM terminal 115-*b* then receives the response packet 1125, and updates its ARQ table to associate the fixed terminal 110-*a* with the destination IP address of the IP packet 1105. The COTM terminal 115-*b* then proceeds to transmit one or more additional packets 1130, using an existing session or creating a new one with fixed terminal 110-*a*, as described above with reference to FIG. 10.

Figure 11B:
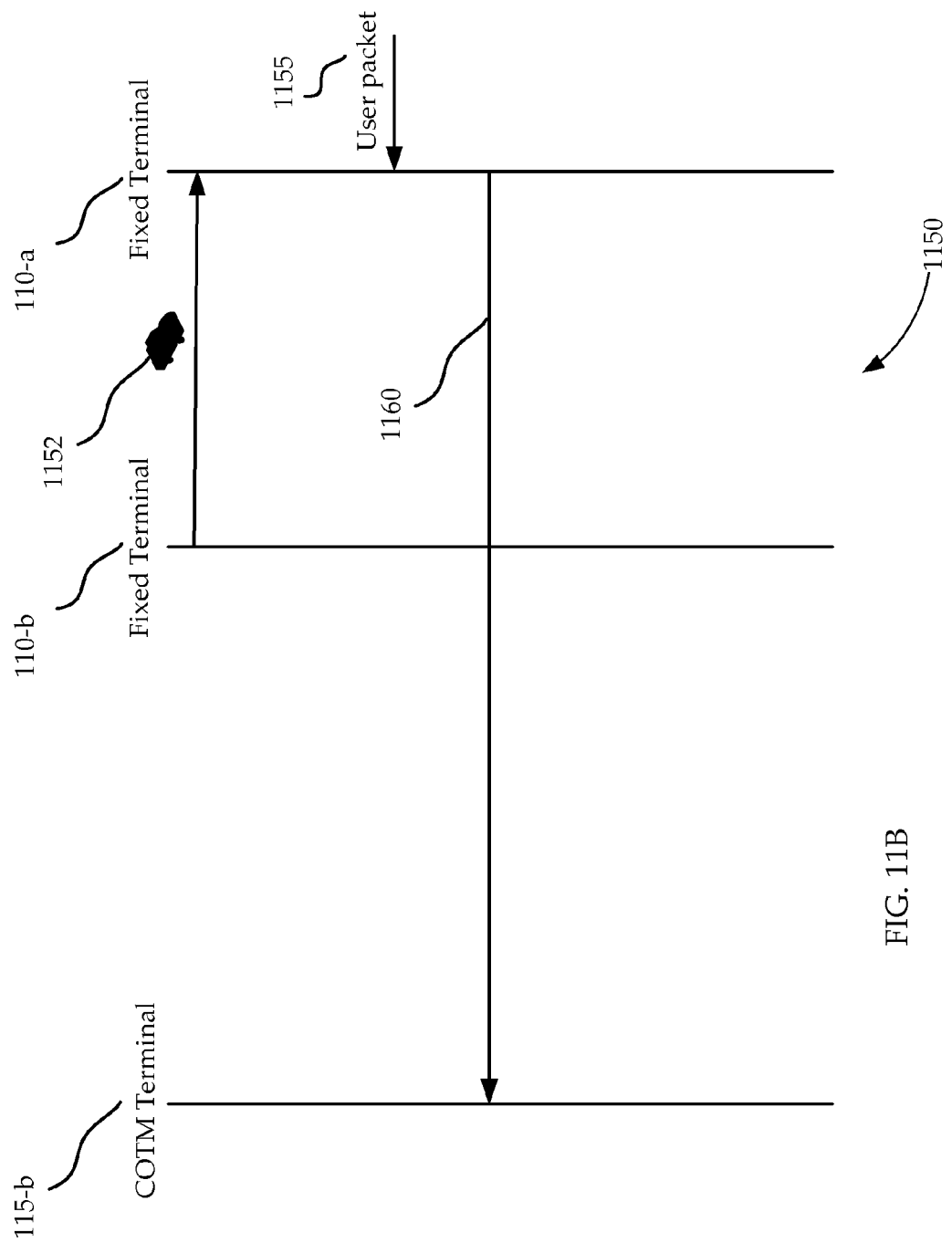
FIG. 11B is packet flow diagram illustrating an alternative terminal discovery process for a mobile host environment according to various embodiments of the invention.

Other updating methods relating to host mobility are available, as well. Referring next to FIG. 11B, a packet flow diagram 1150 illustrates the flow of packets among the COTM terminal 115-*b*, a first fixed terminal 110-*b*, and a second fixed terminal 110-*a* of FIG. 1, 2, or 3, according to an embodiment of the invention. A host 1152, initially associated with the first fixed terminal 110-*b*, moves to the second fixed terminal 110-*a*, as had occurred in the discussion related to FIG. 11A. A user packet 1155 from the host (now associated with the second fixed terminal 110-*a*) is transmitted directed at the destination IP address associated with the COTM terminal 115-*b*.

The fixed terminal 110-*a* then accesses a table (e.g., accessing table 900 of FIG. 9 using ARQ unit 225 of FIG. 2) to determine whether there is a terminal (and possibly a session identifier) that is associated with the destination IP address. If the COTM terminal 115-*b* is the known associated terminal, and a session is available, the fixed terminal 110-*a* may encapsulate the user packet to form an ARQ packet 1160 (e.g., ARQ packet 445 or 485 of FIG. 4B or 4C), and transmit it to COTM terminal 115-*b*. If not, the discovery process described above (related to FIG. 10) may be used, and the ARQ packet 1160 transmitted to the COTM terminal 115-*b* may be a probe packet (e.g., a probe packet 1010 of FIG. 10). When the ARQ packet 1160 reaches the COTM terminal 115-*b*, the ARQ table at the COTM terminal 115-*b* is updated to reflect that the host IP address is now associated with fixed terminal 110-*a* instead of 110-*b*.

Figure 12A:
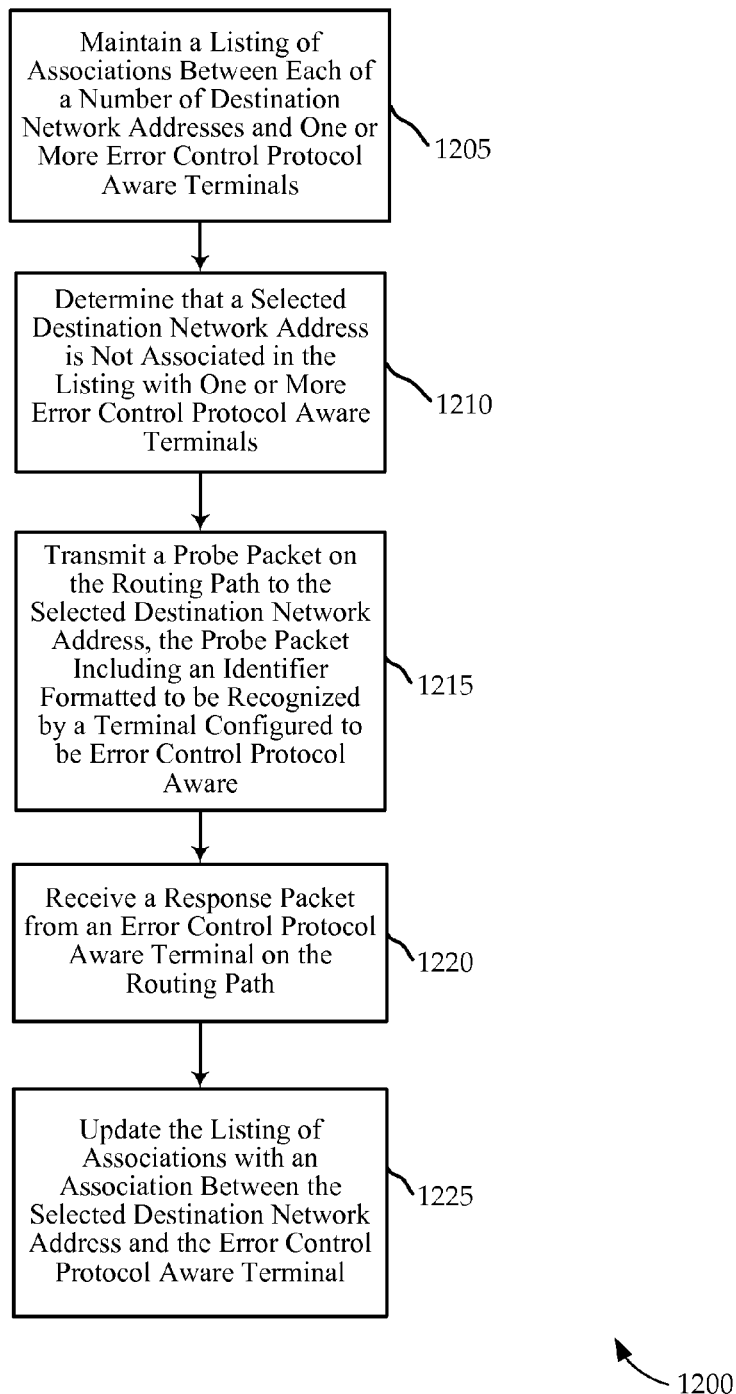
FIG. 12A is a flowchart illustrating a method of transmitting a terminal discovery probe packet according to various embodiments of the invention.

FIG. 12A is a flowchart illustrating a method 1200 of transmitting a terminal discovery probe packet according to various embodiments of the invention. The method 1200 may, for example, be performed in whole or in part by the COTM terminal 115, the fixed terminal 110, or the satellite 105 of FIG. 1, 2, or 3.

At block 1205, a listing of associations (e.g., table 900 of FIG. 9) between each of a number of destination network addresses and one or more error control protocol-aware terminals is maintained. At block 1210, there is a determination that a selected destination network address is not associated with at least one of the error control protocol-aware terminals in the listing. At block 1215, a probe packet is transmitted on the routing path to the selected destination network address, the probe packet including an identifier formatted to be recognized by a terminal configured to be error control protocol-aware. At block 1220, a response packet is received from an error control protocol-aware terminal on the routing path. At block 1225, the listing of associations is updated with an association between the selected destination network address and the error control protocol-aware terminal.

Figure 12B:
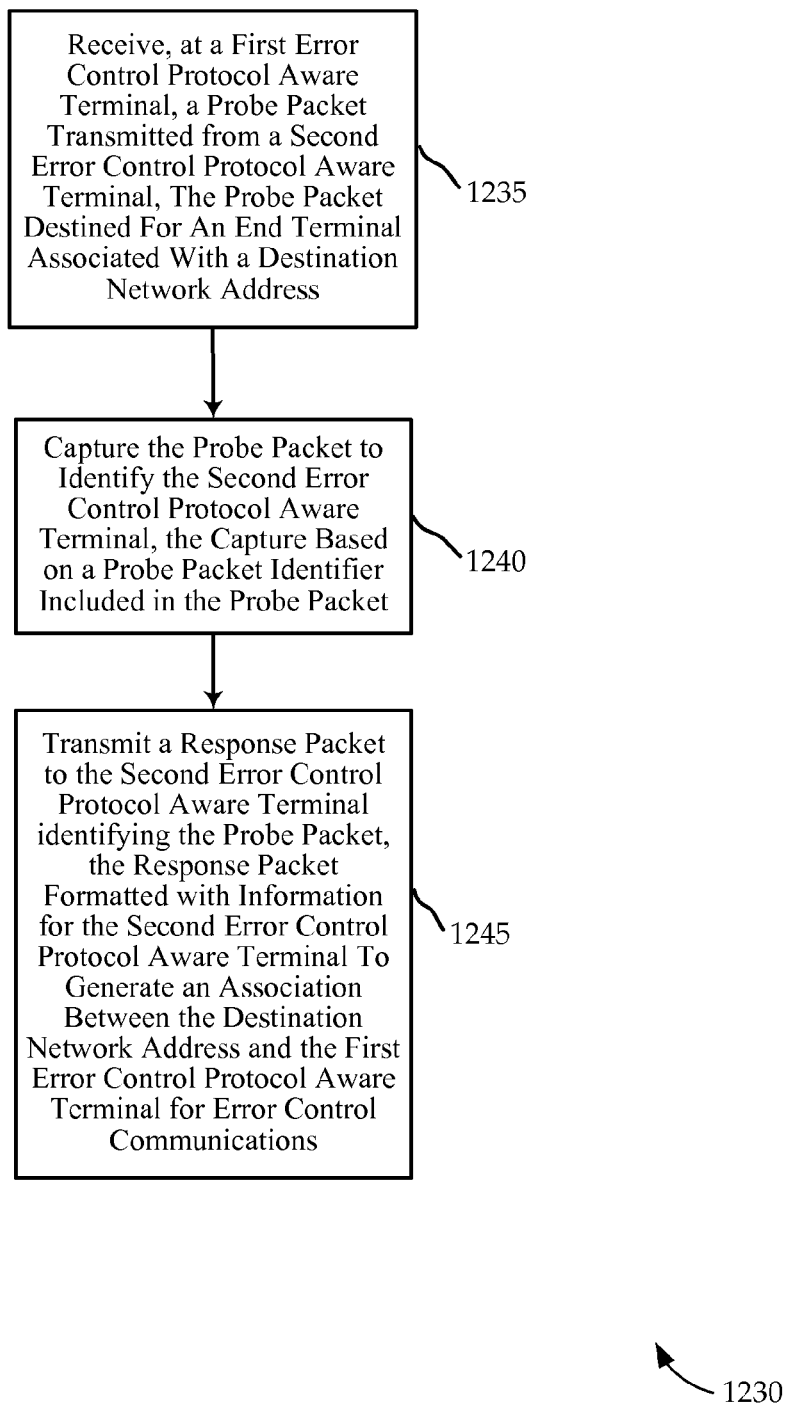
FIG. 12B is a flowchart illustrating a method of receiving a terminal discovery probe packet according to various embodiments of the invention.

FIG. 12B is a flowchart illustrating a method 1230 of receiving a terminal discovery probe packet according to various embodiments of the invention. This method 1230 may, for example, be performed in whole or in part by the COTM terminal 115, the fixed terminal 110, or the satellite 105 of FIG. 1, 2, or 3.

At block 1235, a probe packet is received at a first error control protocol-aware terminal, the probe packet transmitted from a second error control protocol-aware terminal destined for an end terminal associated with a destination network address. At block 1240, the probe packet is captured to identify the second error control protocol-aware terminal, the capture based on a probe packet identifier included in the probe packet. At block 1245, a response packet is transmitted to the second error control protocol-aware terminal identifying the probe packet, the response packet formatted with information for the second error control protocol-aware terminal to generate an association between the destination network address and the first error control protocol-aware terminal for error control communications.

Figure 12C:
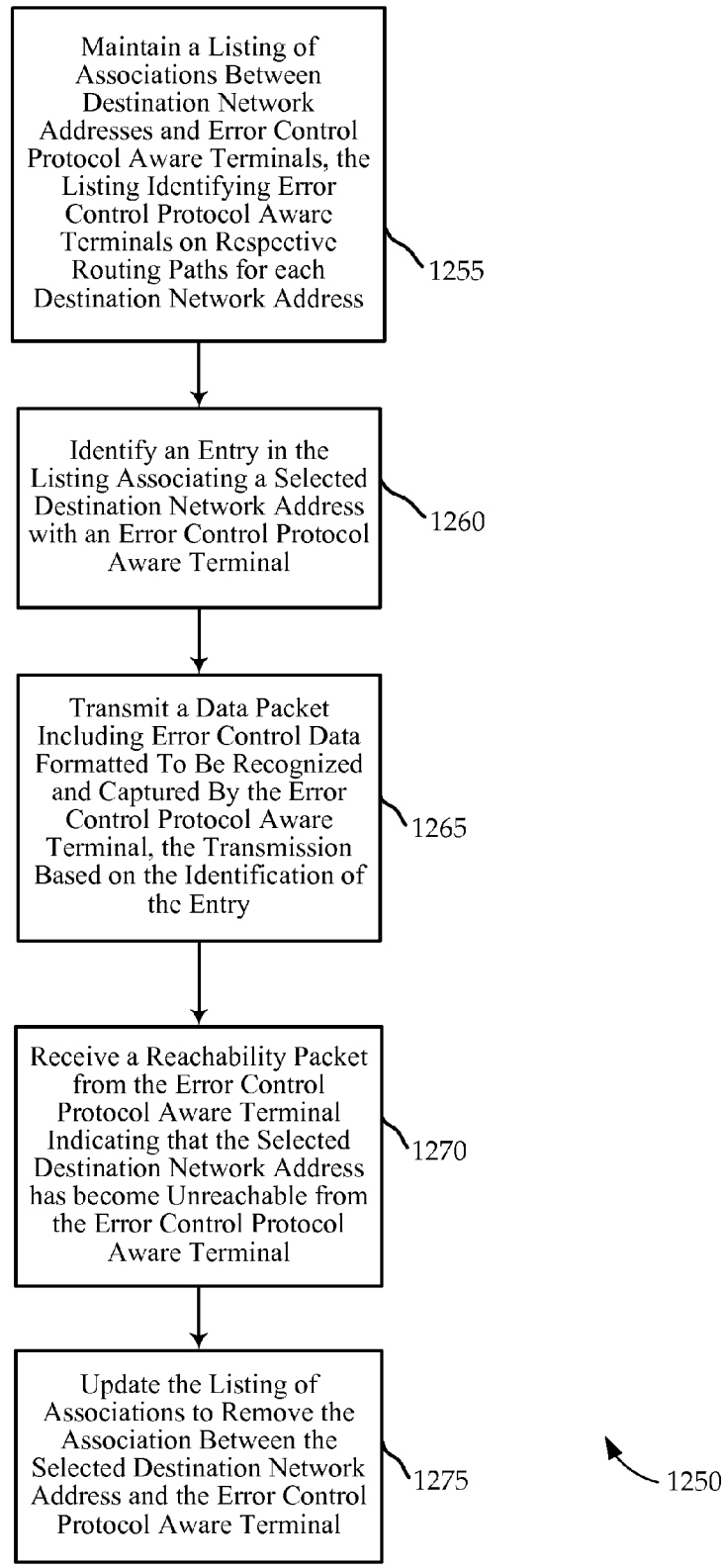
FIG. 12C is a flowchart illustrating a method of updating error control terminal associations according to various embodiments of the invention.

FIG. 12C is a flowchart illustrating a method 1250 of updating error control terminal associations according to various embodiments of the invention. The method 1250 may, again, be performed in whole or in part by the COTM terminal 115, the fixed terminal 110, or the satellite 105 of FIG. 1, 2, or 3.

At block 1255, a listing of associations is again maintained between each of a number of destination network addresses and error control protocol-aware terminals, the listing identifying one or more error control protocol-aware terminals on respective routing paths for each destination network address. At block 1260, an entry in the listing is identified associating a selected destination network address with one of the error control protocol-aware terminals. At block 1265, a data packet is transmitted including error control data formatted to be recognized and captured by the associated error control protocol-aware terminal, the transmission based on the identification of the entry. At block 1270, a reachability packet is received from the error control protocol-aware terminal indicating that the selected destination network address has become unreachable from the error control protocol-aware terminal. At block 1275, the listing of associations is updated to remove the association between the selected destination network address and the error control protocol-aware terminal.

Figure 12D:
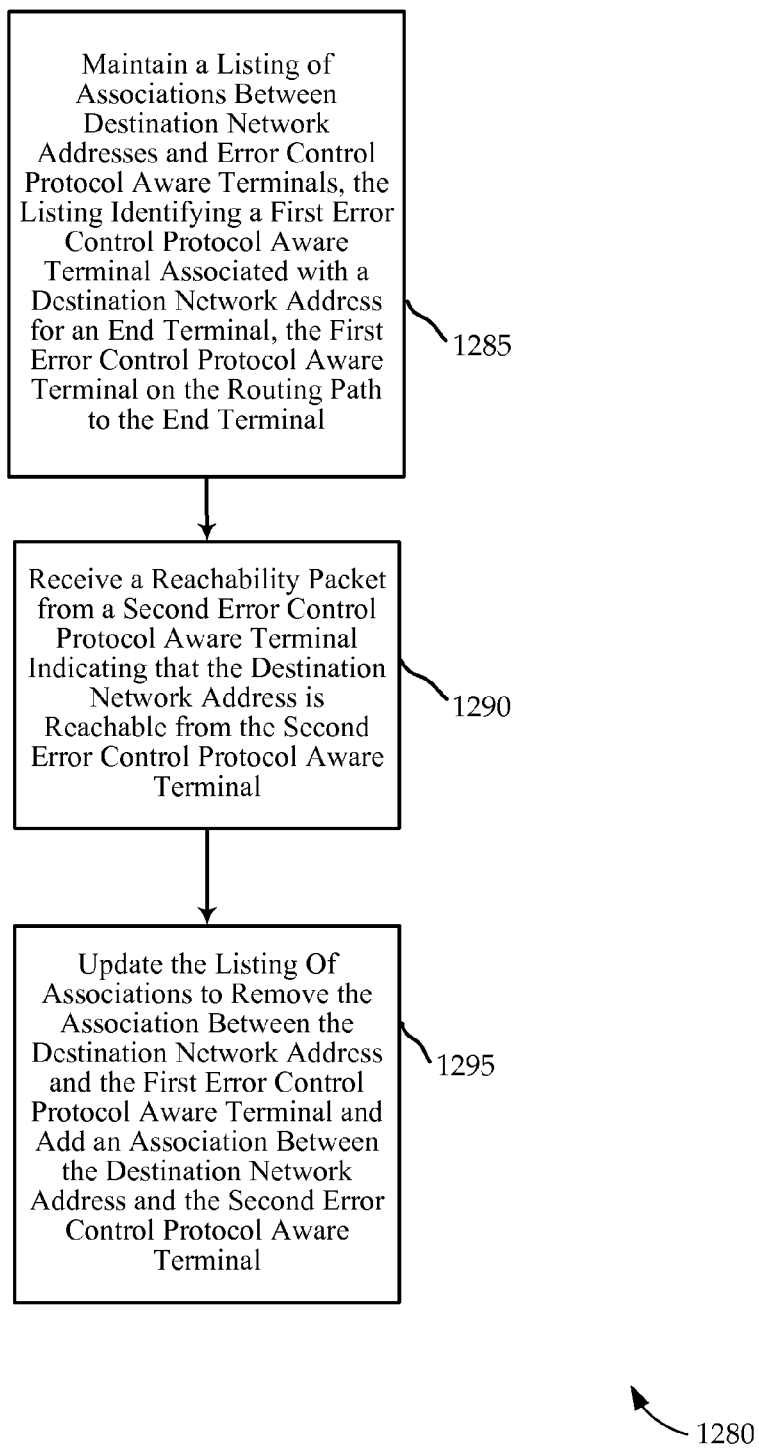
FIG. 12D is a flowchart illustrating an alternative method of updating error control terminal associations according to various embodiments of the invention.

FIG. 12D is a flowchart illustrating an alternative method 1280 of updating error control terminal associations according to various embodiments of the invention. As in the above examples, this method 1280 may be performed in whole or in part by the COTM terminal 115, the fixed terminal 110, or the satellite 105 of FIG. 1, 2, or 3.

At block 1285, a listing of associations is maintained between destination network addresses and error control protocol-aware terminals, the listing identifying a first error control protocol-aware terminal associated with a destination network address for an end terminal, the first error control protocol-aware terminal on the routing path to the end terminal. At block 1290, a reachability packet is received from a second error control protocol-aware terminal indicating that the destination network address is reachable from the second error control protocol-aware terminal. In one embodiment, a second reachability packet may, but need not, be received from a first error control protocol-aware terminal, as well. At block 1295, the listing of associations is updated to remove the association between the destination network address and the first error control protocol-aware terminal and add an association between the destination network address and the second error control protocol-aware terminal.

Figure 13A:
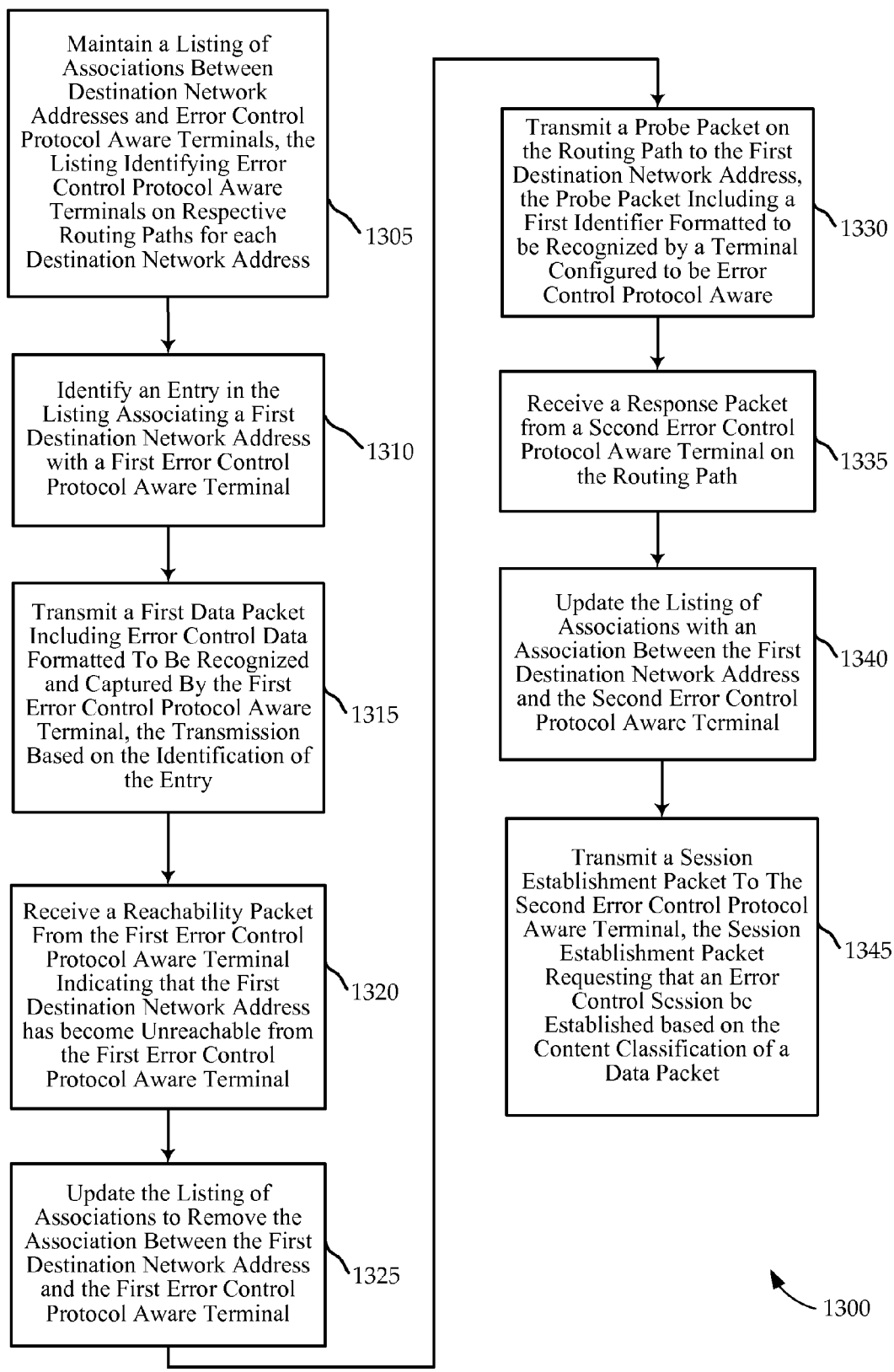
FIG. 13A is a flowchart illustrating a method of establishing error control communications between terminals in a mobile host environment according to various embodiments of the invention.

FIG. 13A is a flowchart illustrating a method 1300 of establishing error control communications between terminals in a mobile host environment according to various embodiments of the invention. This method 1300 may, as in the above examples, be performed in whole or in part by the COTM terminal 115, the fixed terminal 110, or the satellite 105 of FIG. 1, 2, or 3.

At block 1305, a listing of associations is maintained between destination network addresses and error control protocol-aware terminals, the listing identifying error control protocol-aware terminals on respective routing paths for each destination network address. At block 1310, an entry in the listing is identified associating a first destination network address with a first error control protocol-aware terminal. At block 1315, a first data packet is transmitted including error control data formatted to be recognized and captured by the first error control protocol-aware terminal, the transmission based on the identification of the entry.

At block 1320, a reachability packet is received from the first error control protocol-aware terminal indicating that the first destination network address has become unreachable is received from the first error control protocol-aware terminal. At block 1325, the listing of associations is updated to remove the association between the first destination network address and the first error control protocol-aware terminal. At block 1330, a probe packet is transmitted on the routing path to the first destination network address, the probe packet including a first identifier formatted to be recognized by a terminal configured to be error control protocol-aware.

At block 1335, a response packet is received from a second error control protocol-aware terminal on the routing path in response to the probe packet. At block 1340, the listing is updated with an association between the first destination network address and the second error control protocol-aware terminal. At block 1345, a session establishment packet is transmitted to the second error control protocol-aware terminal, the session establishment packet requesting that an error control session be established based on the content classification of a data packet to be transmitted to the first destination network address via the second error control protocol-aware terminal.

Figure 13B:
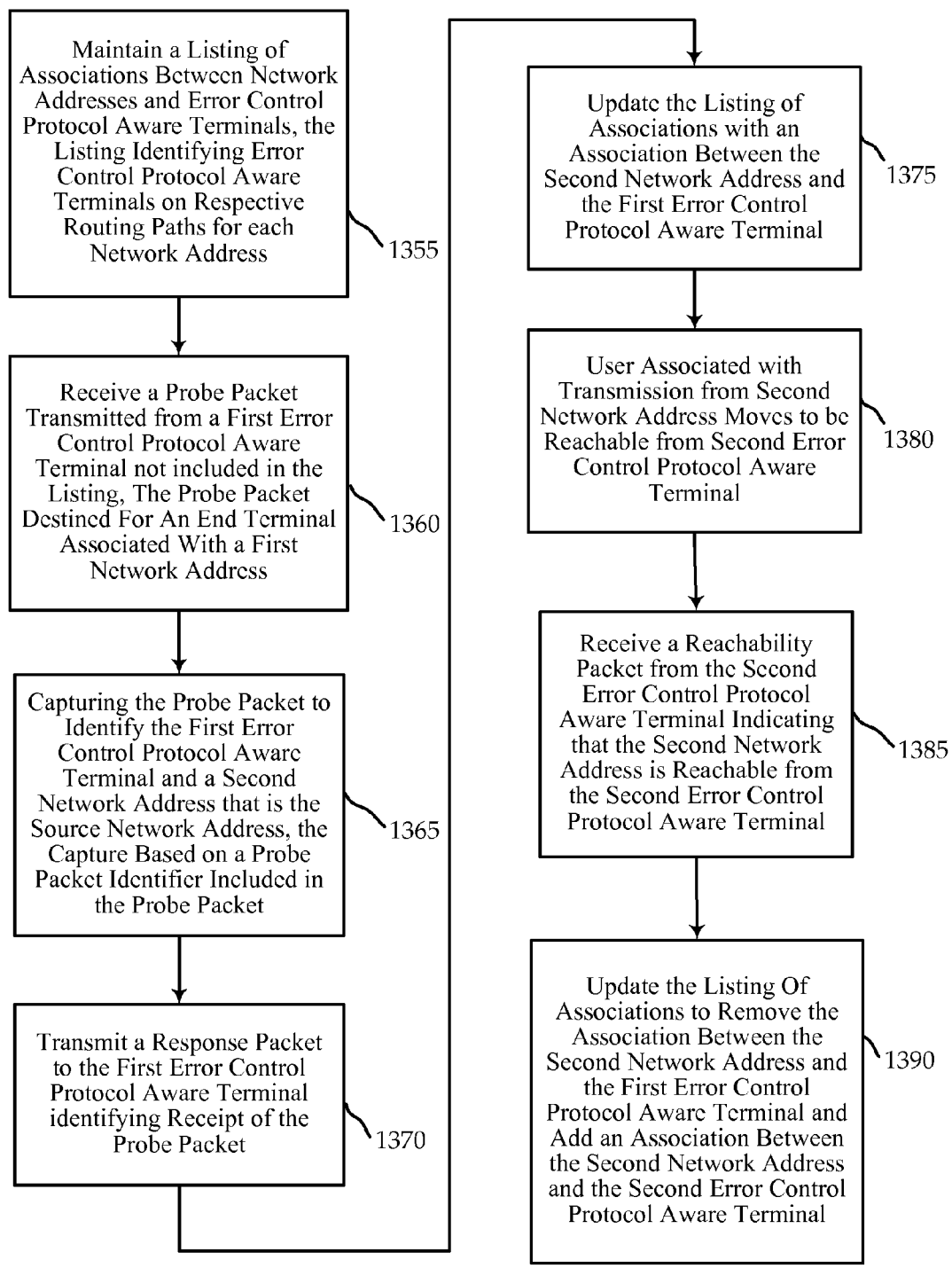
FIG. 13B is a flowchart illustrating a method of updating terminal associations for error control communications between terminals in a mobile host environment according to various embodiments of the invention.

FIG. 13B is a flowchart illustrating a method 1350 of updating terminal associations for error control communications between terminals in a mobile host environment according to various embodiments of the invention. The method 1350 may, for example, be performed in whole or in part by the COTM terminal 115, the fixed terminal 110, or the satellite 105 of FIG. 1, 2, or 3.

At block 1355, a listing of associations is maintained between network addresses and error control protocol-aware terminals, the listing identifying error control protocol-aware terminals on respective routing paths for each network address. At block 1360, a probe packet is received from a first error control protocol-aware terminal not included in the listing, the probe packet destined for an end terminal associated with a first network address. At block 1365, the probe packet is captured to identify the first error control protocol-aware terminal and a second network address that is the source network address, the capture based on a probe packet identifier included in the probe packet.

At block 1370, a response packet is transmitted to the first error control protocol-aware terminal, confirming receipt of the probe packet. At block 1375, the listing of associations is updated with an association between the second network address and the first error control protocol-aware terminal. At block 1380, the user associated with transmission from the second network address moves to be reachable from a second error control protocol-aware terminal. At block 1385, a reachability packet is received from the second error control protocol-aware terminal indicating that the second network address is reachable from the second error control protocol-aware terminal. At block 1390, the listing of associations is updated to remove the association between the second network address and the first error control protocol-aware terminal and to add an association between the second network address and the second error control protocol-aware terminal.

In yet another set of embodiments, features of these error control mechanisms include a configurable delay limit, which may be tailored to traffic type or class. IPv4 and IPv6 packets each include a one byte Type of Service (ToS) or Differentiated Services (DiffServ) field. As will be discussed in greater detail below, this field may be used to indicate the underlying service being transported (referred to herein as the traffic content classification). The field could be used to define the delay sensitivity of the frame being transported. Frames with different delay sensitivities (e.g., UDP v. TCP packets, voice v. e-mail) may then be configured with different delay limits at the transmitter, along with related time limits for buffering at the receiver. Using varied delay limits, multiple different ARQ sessions with differing delay limits may take place concurrently between terminals (or between a terminal and a satellite).

Referring first to FIG. 14, an example of a delay limit table 1400 is shown that may be stored in memory of a terminal (e.g., the fixed terminal 110, COTM terminal 115, or satellite 105 of FIG. 1), or stored elsewhere and remotely accessed. A first column includes a list of various traffic content classifications 1405 (streaming audio, streaming video, interactive audio, interactive video, and other data). In the illustrated embodiment, there are two different levels of quality of service 1410, and these may result in different delay limits. Therefore, in the illustrated embodiment, the delay limit 1415 for retransmission from a given terminal may be based on a content classification 1405 and quality of service 1410. In other embodiments, there may be more, fewer, or different classifications for data traffic and quality of service metrics. Delay limits may be also based on load at a terminal, latency at a terminal, estimated transit time to an intermediate terminal or end user, or estimated processing time at particular devices in the routing path.

Figure 15:
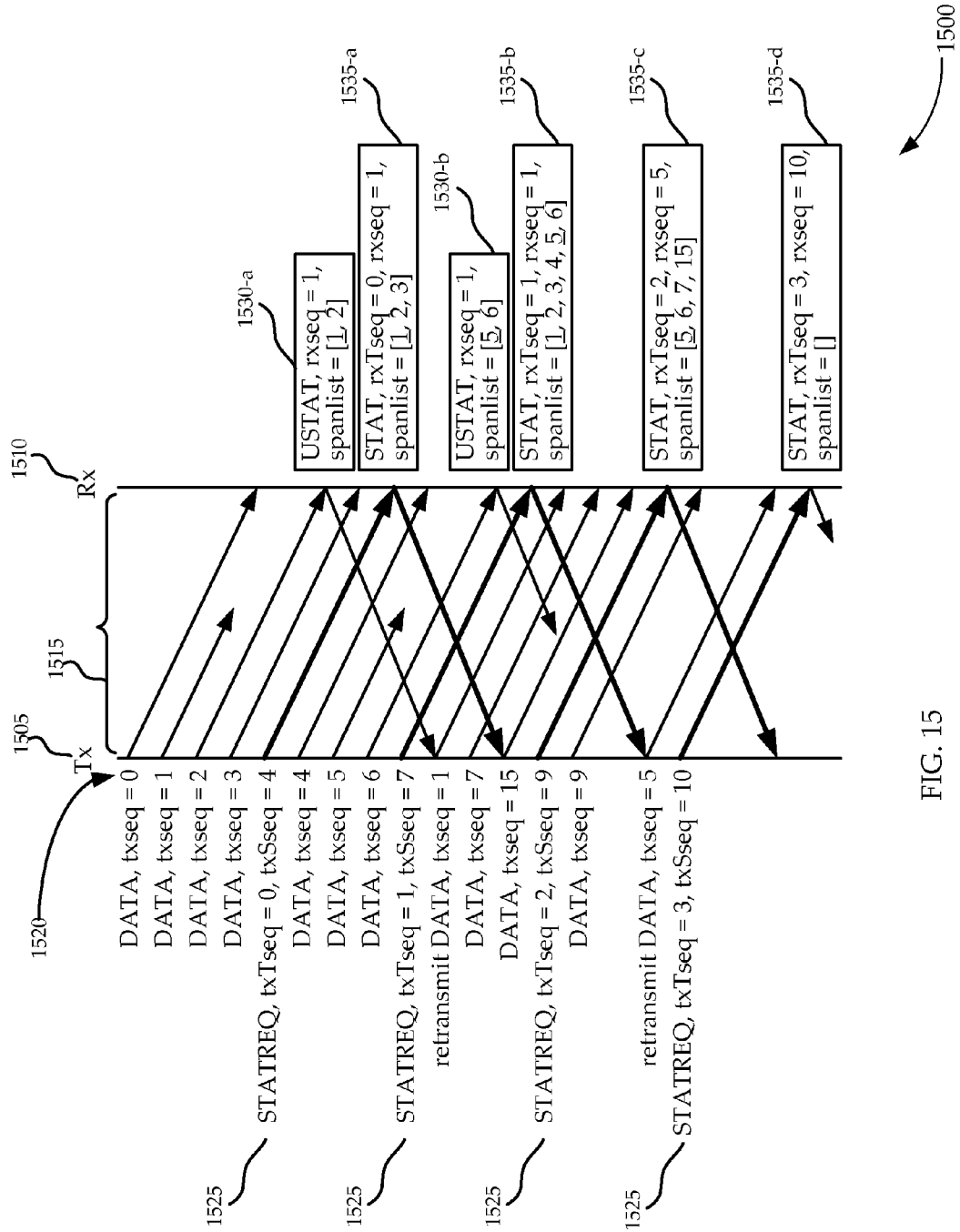
FIG. 15 is packet flow diagram illustrating a range of options for packet retransmission according to various embodiments of the invention.

Referring next to FIG. 15, a packet flow diagram 1500 illustrating options for packet retransmission will be described. The illustrated diagram assumes a single delay limit (thus, it may represent a single session), but the principles may be applied to a varied delay limit environment. Such protocols may be used on links, for example, between a satellite 105 and a terminal (110 or 115) of FIG. 1, or from a terminal (110 or 115) to a terminal (110 or 115) through a satellite 105. In such links, there will be a transmitter 1505 and receiver 1510 of packets, although a particular device (terminal or satellite) may be both a transmitter and receiver. For example, in an embodiment described with reference to FIG. 2, the transmitter 1505 may be the COTM terminal 115-*b*, and the receiver 1510 may be the fixed terminal 110-*b*.

The transmissions may, for example, be formatted as ARQ packets 445, 485, 555 or control packets 470, 495, 575 of FIG. 4B, 4C, or 5B. The transmissions in either direction are represented by the arrowed lines 1515 between transmitter 1505 and receiver 1510.

In one embodiment, one or more packets are identified as packets to be transmitted with appended error control data, as described above (e.g., with reference to the routing unit 220 of FIG. 2). A packet to be transmitted is buffered and assigned a send sequence number txseq 1520 (and a delay limit may be set based on the content classification of the packet). At certain intervals (for example, every N packets (e.g., N=4), after variable or set time intervals, or a combination thereof), a STATREQ packet 1525 is sent by the transmitter 1505 to the receiver 1510. In the illustrated embodiments, the STATREQ packet 1525 is sent without payload, but in other embodiments it may include a payload. The intervals between each STATREQ packet 1525 may be based on the delay limit, as well. This STATREQ packet 1525 may contain txTseq (the time sequence number) and txSseq (the highest sequence number sent+1). In one embodiment, the STATREQ packet 1525 is also sent whenever a certain time has elapsed (e.g., 0.1 seconds) since the last STATREQ packet 1525 was sent, and some data remains unacknowledged. The STATREQ packet 1525 may also be sent when a certain amount of time (e.g., 5 seconds) has elapsed since the last STATREQ packet 1525 was sent, and no data remains unacknowledged. Note that within a round trip time, several STATREQ packets 1525 may be sent.

In one embodiment, the time sequence txTseq is maintained by the transmitter 1505, which is incremented after each STATREQ packet 1525 is transmitted. The current time sequence value, txTseq, may be saved locally (or, for example, at the receiver 1510) for each packet, when it is transmitted or retransmitted.

When the receiver 1510 receives an out-of-sequence packet, whose sequence number is larger (in this example, by two or more sequence numbers) than the largest sequence number received, the receiver 1510 may be triggered to buffer the out-of sequence packet and to send a USTAT packet 1530 to the transmitter 1505, the USTAT packet 1530 identifying the rxseq (the sequence number below which all packets have been received, or discarded (because the buffering time limit expired)). The USTAT packet 1530 may also provide spanlist information (sequence numbers or other information for the missing packet(s) and/or sequence numbers or other information for the received packet(s)). Thus, the rxseq and spanlist may each provide acknowledgement information (making up both ACKs and NACKs).

When the receiver 1510 receives a STATREQ packet 1520, it may be configured to send a STAT packet 1535 which contains rxTseq (the received time sequence number), rxseq (the sequence number below which all packets have been received), and spanlist information (sequence numbers or other information for the missing packet(s) and/or sequence numbers or other information for the received packet(s)).

When the transmitter 1505 receives a USTAT packet 1530, it may free up buffer space (discarding the buffered data) of the acknowledged packets (and perhaps any packets for which a delay timer has expired). When the transmitter 1505 receives a USTAT packet 1535, it may retransmit missing packets identified in the USTAT packet 1535 when the delay limit has not expired. When the transmitter 1505 receives a STAT packet 1535, it may free up buffer space (discarding the buffered data) of the acknowledged packets (and perhaps any packets for which a delay timer has expired). The transmitter 1505 may also retransmit the missing packets identified in the STAT packet 1535, if the delay limit has not expired. In some embodiments, the transmitter 1505 response to the STAT packet 1535 is performed only if the txTseq (the time sequence number) saved for the packet is less than or equal to the rxTseq (the received time sequence number) received in the STAT packet.

In various retransmission protocol embodiments, the receiver 1510 buffers out-of-sequence packets and delivers them in-sequence to the user network when missing packets arrive. The receiver 1510 then discards the buffered data packets. The receiver 1510 may also buffer the out-of-sequence packets until a time limit expires (or is about to expire), and then forward such packets out-of-sequence and discard them upon forwarding. This time limit for buffering may be received from the transmitter 1505, or may be calculated based on the delay limit for the transmitter (e.g., by adding an estimated or average transit and processing time to the delay limit, in addition to a margin). There are, thus, a number of different ways that a buffering time limit may be calculated or set for the receiver. Those skilled in the art will recognize that the delay limits and time limits may take on a variety of forms, and may be calculated based on one another. As used herein, the discarding of buffered data packets may be accomplished by freeing memory space.

The transmitter 1505 may maintain a local sequence number (referred to hereinafter as "NA"), such that all packets below NA have been acknowledged by the receiver (or timed out because of the expiration of the delay timer). This variable may be updated by the rxSeq variable in a STAT 1535 or USTAT 1530 packet received at the transmitter. A spanlist may contain a compact representation of a list of sequence numbers of missing packets and a list of sequence numbers of received out-of-sequence packets, although in other embodiments some or all of this information may be represented in alternative forms.

The retransmission protocol may operate in real-time mode (when certain delay limits are implemented), or may operate without delay limits in other embodiments. It is worth making a more detailed examination of embodiments in which delay limits are implemented. In one such embodiment, the transmitter 1505 may be configured with certain delay limits (e.g, hereinafter identified as a delayLimit time) for a particular ARQ session that carries real-time traffic. In such an embodiment, a transmitter 1505 may be configured to append a data packet header containing a field (e.g., a maxDelay field), which allows the receiver 1510 to calculate how long the packet should be buffered at the receiver 1510.

In one embodiment, when a packet arrives at the transmitter 1505 from a network, the transmitter 1505 may save an arrival time for the packet, and may calculate a delay limit for retransmission (hereinafter, "delayLimit"). When the transmitter 1505 transmits or retransmits a packet, it may be configured to check whether, for example, current time−packet arrival time>delayLimit. If no, then it may set the maxDelay field to delayLimit−(current time−packet arrival time), and send the packet. If yes, then the packet will not be transmitted.

When the transmitter 1505 sends a STATREQ packet 1525, it may check if there are any unacknowledged packets which have been waiting for a time equal or greater than delayLimit. If so, it may discard them (e.g., by freeing buffer space they occupy) and update NA through (or past) those packets. The NA value may be sent by the transmitter in STATREQ 1525 packets.

Turning to the receiver 1510, when it receives an out-of-sequence packet, it may save the maxDelay field of the packet, and the packet transmit and reception times for the packet. When a receiver 1510 receives a STATREQ packet 1525 with NA greater than rxseq, the receiver may bump up the rxseq value to NA and deliver any out-of-sequence packets below NA to the network, freeing up the buffer space for the delivered packets. The receiver 1510 may do so based on the maxDelay field of one or more of the packets. Periodically (e.g., at a variable or fixed interval), and when it receives a STATREQ packet 1525, a receiver 1510 may check if any out-of-sequence packets have (current time−packet transmission time)>maxDelay value of that packet. If yes, then that packet may be delivered to the network (thereby freeing up the buffer space for the delivered packets), and rxseq may be bumped up to the next missing packet.

Additionally, each data packet (or a subset thereof) may contain a timestamp value, containing the time when the packet was last transmitted. If the receiver and transmitter maintain synchronized time, the packet transit time between the transmitter and receiver may be measured=(current local time−timestamp value), and then it may be subtracted from the received maxDelay value. In other embodiments, the transmit time may be estimated or otherwise accounted for. For example, if the receiver and transmitter cannot maintain synchronized time, then the receiver may use a configured lower bound on the transit delay value to subtract from the packet maxDelay value. It is worth noting that different delay limits and time limits may be used for different applications and/or types of service. Increasing the delay limit may make the protocol more reliable but require more memory and may increase delay. It is also worth mentioning that description of the delay limit for retransmission and the time limit for buffering are for purposes of example only, and many alternative implementations may be based on the enabling description herein.

Figure 16A:
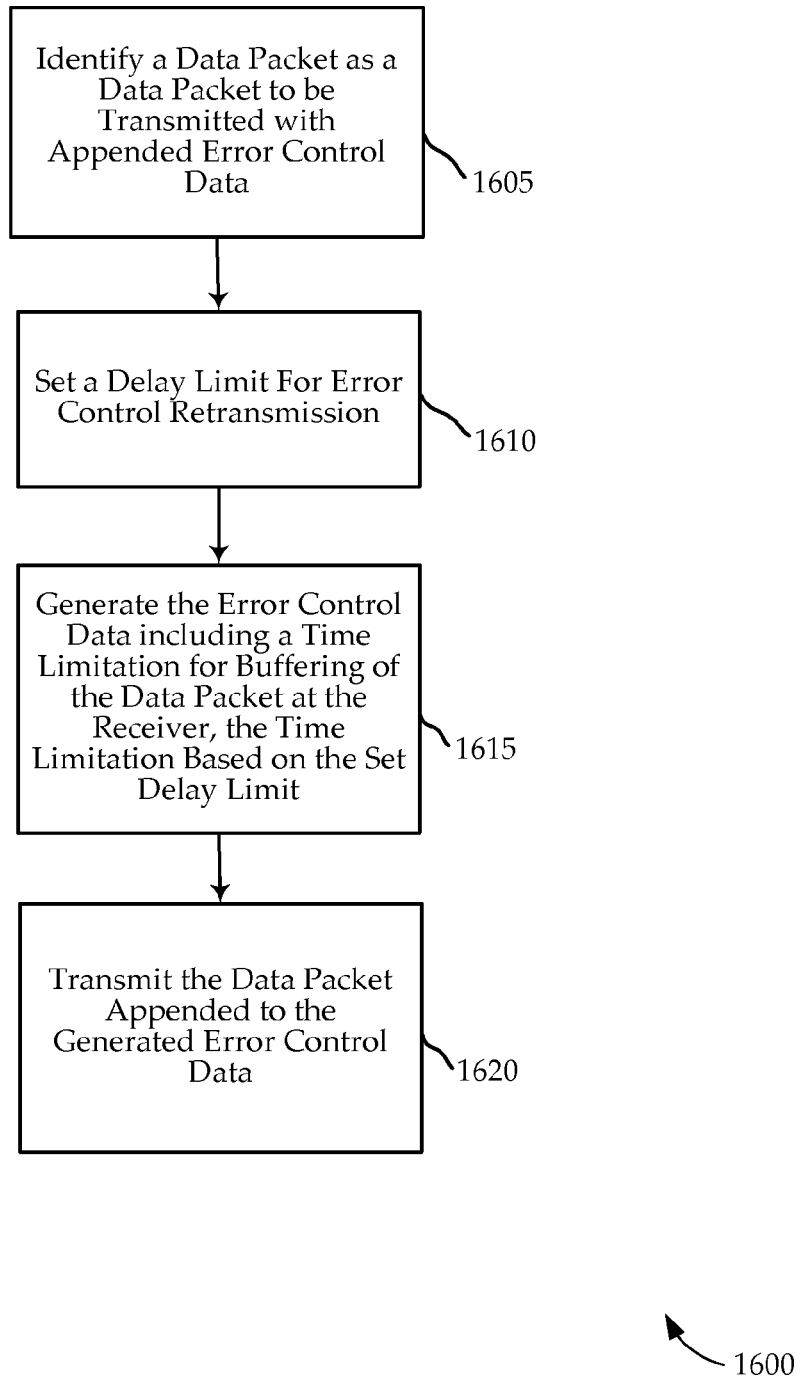
FIG. 16A is a flowchart illustrating a method of setting delay limits for error control retransmissions according to various embodiments of the invention.

FIG. 16A is a flowchart illustrating a method 1600 of setting delay limits for error control retransmissions according to various embodiments of the invention. The method 1600 may, for example, be performed in whole or in part by the COTM terminal 115, the fixed terminal 110, or the satellite 105 of FIG. 1, 2, or 3.

At block 1605, a data packet is identified as a packet to be transmitted with appended error control data. At block 1610, a delay limit is set for error control retransmissions. At block 1615, the error control data is generated, the error control data including a time limitation for buffering of the data packet at the receiver based on the set delay limit. At block 1620, the data packet and appended error control data are transmitted.

Figure 16B:
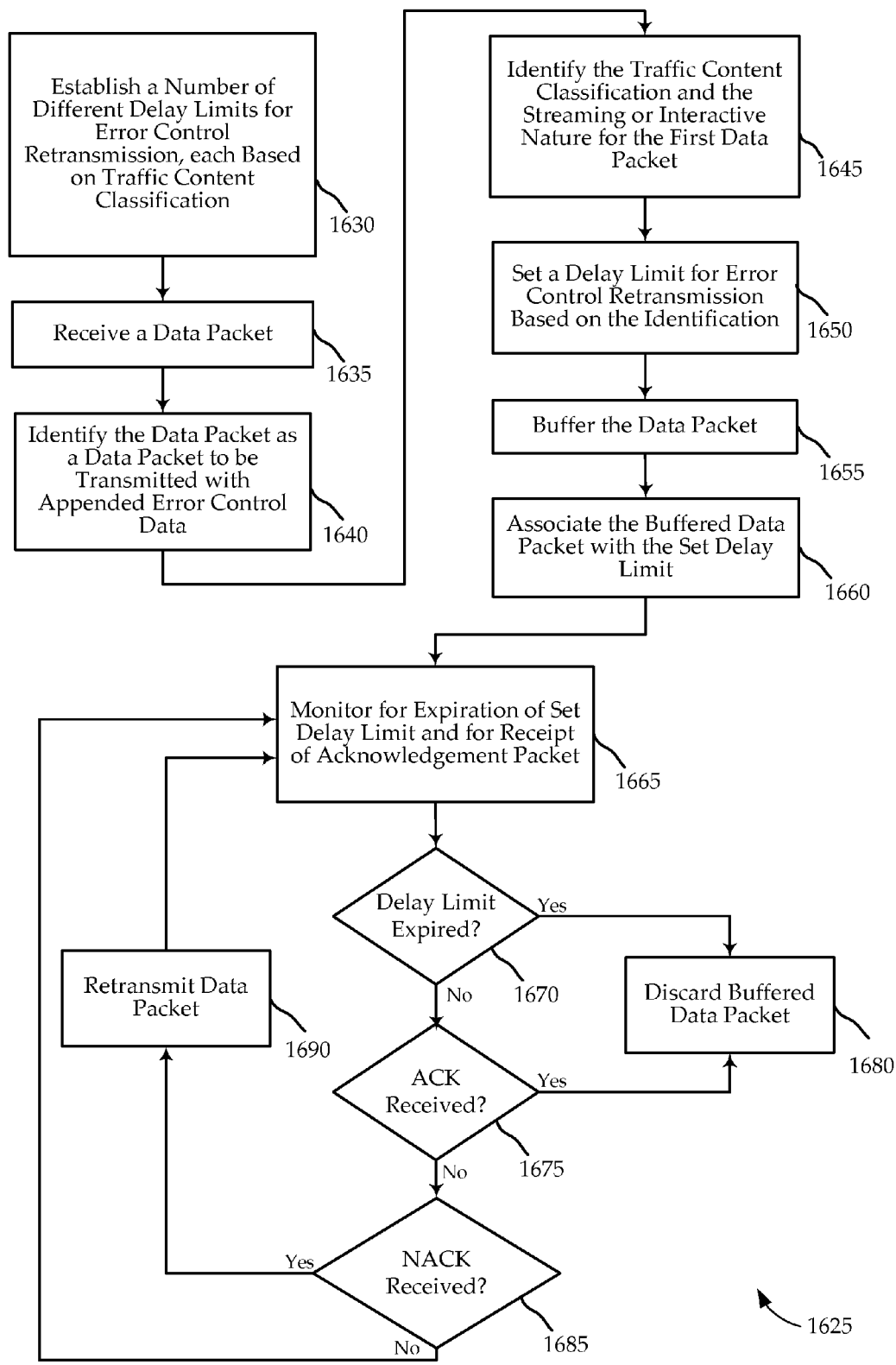
FIG. 16B is a flowchart illustrating a method of setting delay limits for error control retransmissions based on traffic content according to various embodiments of the invention.

FIG. 16B is a flowchart illustrating an alternative method 1625 of setting delay limits for error control retransmissions based on traffic content according to various embodiments of the invention. The method 1625 may, for example, be performed in whole or in part by the COTM terminal 115, the fixed terminal 110, or the satellite 105 of FIG. 1, 2, or 3.

At block 1630, a number of different delay limits are established for error control retransmission, each based on traffic content classification. At block 1635, a data packet is received. At block 1640, the data packet is identified as a data packet to be transmitted with appended error control data.

At block 1645, the traffic content classification is identified for the first data packet. At block 1650, a delay limit is set for error control retransmission based on the identified classification. At block 1655, the data packet is buffered, while at block 1660, the buffered data packet is associated with the set delay limit.

At block 1665, time is monitored for expiration of set delay limit, and incoming packets are monitored for receipt of acknowledgement packet (e.g., a USTAT packet 1530 or STAT packet 1535 of FIG. 15). At block 1670, a determination is made whether the delay limit for retransmission has expired. If not, at block 1675, a determination is made whether an acknowledgment has been received for the data packet (e.g., from the rxseq or spanlist information of a STAT packet 1535 or a USTAT packet 1530). If the delay limit for retransmission has expired, or acknowledged receipt has been received for the data packet, the buffered data packet is discarded at block 1680.

Assuming the delay limit for retransmission has not expired, and yet no acknowledged receipt has been received, a determination may be made at block 1685 regarding a received negative acknowledgement (e.g., a missing packet from the rxseq or spanlist information of a STAT packet or a USTAT packet). The missing data packet may be retransmitted if a sufficient interval has elapsed at block 1690. The processing then returns to block 1665, where time is monitored for expiration of the set delay limit, and incoming packets are monitored for receipt of acknowledgement packets.

Figure 17A:
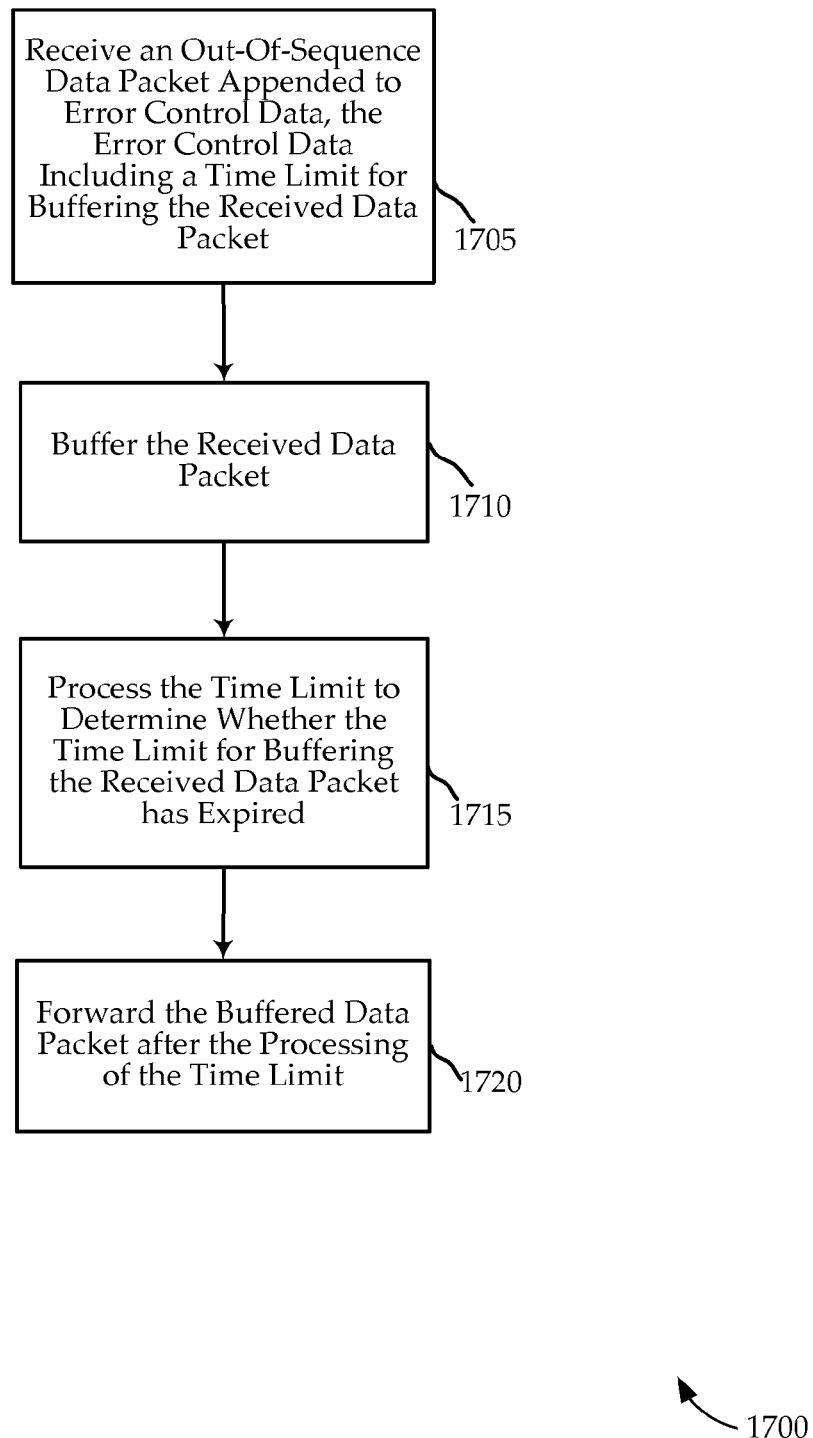
FIG. 17A is a flowchart illustrating a method of setting buffering time limits at receiving terminals according to various embodiments of the invention.

FIG. 17A is a flowchart illustrating a method 1700 of setting buffering time limits for waiting for missing packets according to various embodiments of the invention. The method 1700 may, as in the above examples, be performed in whole or in part by the COTM terminal 115, the fixed terminal 110, or the satellite 105 of FIG. 1, 2, or 3.

At block 1705, an out-of-sequence data packet appended to error control data is received, the error control data including data for calculating a time limit for buffering the received data packet. At block 1710, the received data packet is buffered. At block 1715, the time limit is processed to determine whether the time limit for buffering the received data packet has expired. At block 1720, the buffered data packet is forwarded after the processing of the time limit.

Figure 17B:
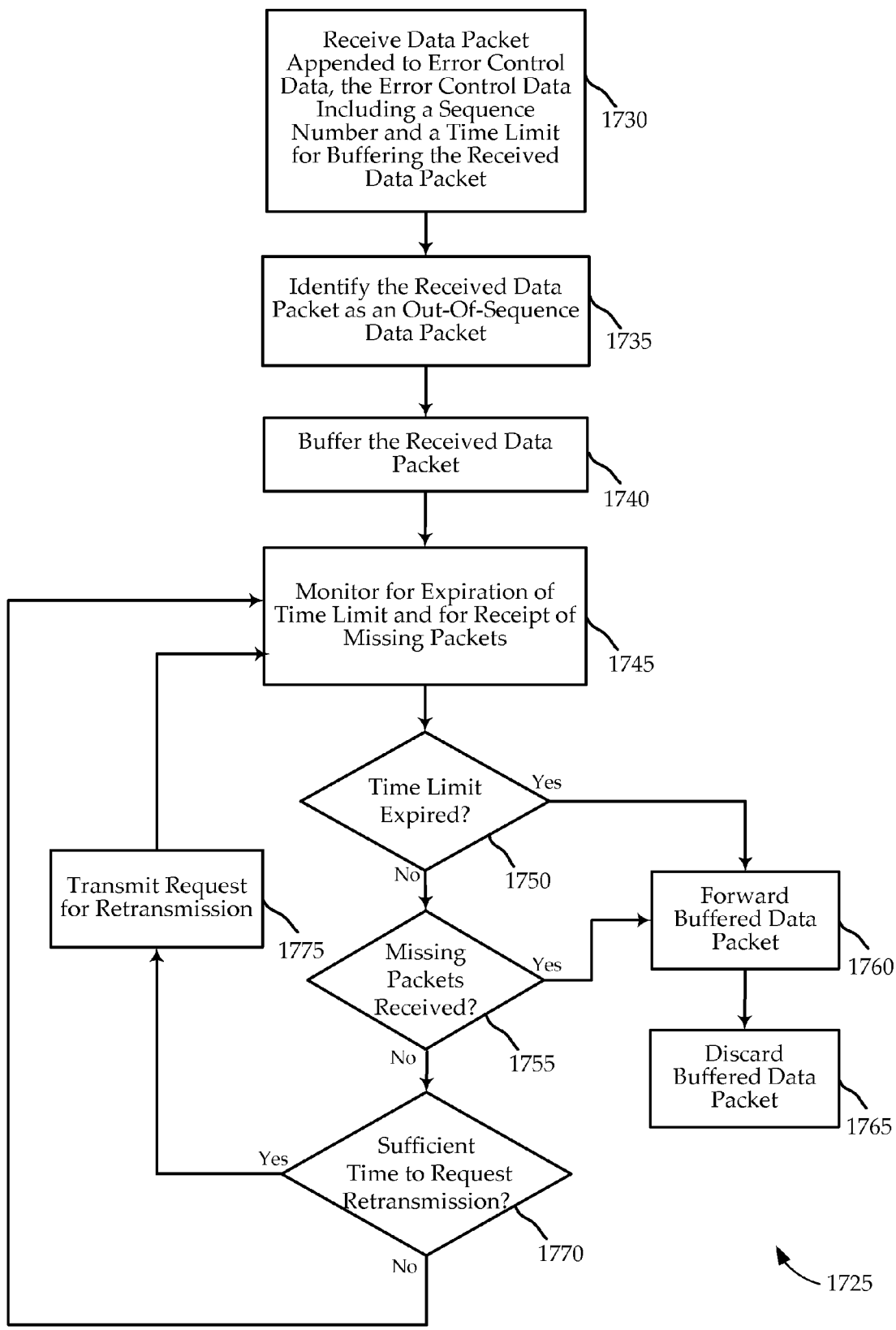
FIG. 17B is a flowchart illustrating a method of setting and monitoring time limits for missing packets at receiving terminals according to various embodiments of the invention.

FIG. 17B is a flowchart illustrating a method 1725 of setting and monitoring time limits for missing packets according to various embodiments of the invention. As above, the method 1700 may be performed in whole or in part by the COTM terminal 115, the fixed terminal 110, or the satellite 105 of FIG. 1, 2, or 3.

At block 1730, a data packet appended to error control data is received, the error control data including a sequence number and a time limit for buffering the received data packet. At block 1735, the received data packet is identified as an out-of-sequence data packet. At block 1740, the received data packet is buffered (note, in one embodiment in-sequence packets are simply forwarded and discarded, without waiting for missing packets). At block 1745, time is monitored for expiration of the time limit, and received packets are monitored for missing packets.

At block 1750, a determination is made whether the time limit for buffering has expired. If not, at block 1755, a determination is made whether missing packets have been received for the data packet. If either the time limit for buffering has expired (or is about to expire), or missing packets have been received to make the data packet an in-sequence data packet, the buffered data packet is forwarded at block 1760, then discarded at block 1765.

Assuming the time limit for buffering has not expired, and yet packets remain missing, a determination may be made at block 1770 regarding whether there is sufficient time to request retransmission at block 1775 (e.g., in a STAT packet 1535 or a USTAT 1530 packet). The request for retransmission may be sent if a sufficient time for buffering remains. The processing then returns to block 1745, where time is monitored for expiration of the time limit, and incoming packets are monitored for missing packets.

It should be noted that the methods, systems, devices, and software discussed above are intended merely to be examples. It must be stressed that various embodiments may omit, substitute, or add various procedures or components as appropriate. For instance, it should be appreciated that, in alternative embodiments, the methods may be performed in an order different from that described, and that various steps may be added, omitted, or combined. Also, features described with respect to certain embodiments may be combined in various other embodiments. Different aspects and elements of the embodiments may be combined in a similar manner. Also, it should be emphasized that technology evolves and, thus, many of the elements are examples and should not be interpreted to limit the scope of the invention.

Specific details are given in the description to provide a thorough understanding of the embodiments. However, it will be understood by one of ordinary skill in the art that the embodiments may be practiced without these specific details. It is also worth noting that well-known circuits, processes, algorithms, structures, and techniques have been shown without unnecessary detail in order to avoid obscuring the embodiments.

The embodiments may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure.

Moreover, as disclosed herein, the term "memory" or "memory unit" may represent one or more devices for storing data, including read-only memory (ROM), random access memory (RAM), magnetic RAM, core memory, magnetic disk storage mediums, optical storage mediums, flash memory devices or other computer-readable mediums for storing information. The term "computer-readable medium" includes, but is not limited to, portable or fixed storage devices, optical storage devices, wireless channels, a sim card, other smart cards, and various other mediums capable of storing, containing, or carrying instructions or data.

Furthermore, embodiments may be implemented by hardware, software, firmware, middleware, microcode, hardware description languages, or any combination thereof. When implemented in software, firmware, middleware, or microcode, the program code or code segments to perform the necessary tasks may be stored in a computer-readable medium such as a storage medium. Processors may perform the necessary tasks.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

What is claimed is:

1. A system for network layer error control for communications via satellite, the system comprising:
    a first terminal configured to:
        receive a first data packet from an initiating terminal, the first data packet destined for an end terminal via a second terminal;
        generate a first error control header for the first data packet; and
        encapsulate the first error control header for transmission at the network layer appended to the first data packet;
    the second terminal, in communication with the first terminal via the satellite, and configured to:
        receive the first error control header appended to the first data packet;
        process the first error control header to analyze error control information;
        generate a second data packet with acknowledgement information for transmission to the first terminal at the network layer in response to the received first error control header transmitted at the network layer; and
        encapsulate a second error control header comprising the acknowledgement information for transmission at the network layer.

2. The system of claim 1, wherein the first terminal is further configured to:
    buffer the first data packet until the second data packet is received from the second terminal in response to the transmitted error control header.

3. The system of claim 1, wherein the first terminal is further configured to:
    receive the second data packet, wherein the acknowledgement information is encapsulated at the network layer; and
    process the acknowledgement information from the network layer to determine whether the first data packet was received.

4. The system of claim 1, further comprising:
    an initiating terminal, remote from the first terminal, the initiating terminal configured to buffer the first data packet until a positive acknowledgement is received from the end terminal.

5. The system of claim 1, wherein the second terminal is further configured to:
    forward the first data packet to the end terminal, the end terminal remote from the second terminal.

6. The system of claim 1, wherein the second terminal is further configured to:
    determine that the first data packet is an out-of-sequence data packet;
    buffer the first data packet until at least when preceding in-sequence data packets are received and forwarded from the second terminal directed at the end terminal; and
    forward the buffered first data packet to the end terminal upon determining the first data packet has become an in-sequence data packet.

7. The system of claim 1, wherein the second terminal is further configured to:
    transmit the second data packet via the satellite to the first terminal.

8. The system of claim 1, further comprising:
    the satellite, in communication with the first terminal and the second terminal, and configured to:
        receive a first set of data comprising the error control header appended to the first data packet;
        process the first set of data at the network layer; and
        forward the error control header and appended first data packet to the second terminal.

9. A method of network layer error control for communications links, the method comprising:
    processing a first data packet destined for an end terminal via an intermediate terminal;
    generating a first error control header for the first data packet;
    encapsulating the first error control header for transmission at the network layer appended to the first data packet; and receiving a second data packet appended to a second error control header transmitted from the intermediate terminal in response to the first error control header, the second error control header, comprising acknowledgement information for the first data packet, being encapsulated for transmission at the network layer.

10. The method of claim 9, further comprising:
receiving the first data packet from an initiating terminal, the initiating terminal located remotely from a terminal performing the receiving the first data packet step.

11. The method of claim 9, further comprising:
transmitting the first data packet and the appended first error control header, the transmission directed to the intermediate terminal via satellite.

12. The method of claim 9, further comprising:
identifying the first data packet as a data packet that will pass through a network layer error control aware terminal, the network layer error control aware terminal comprising the intermediate terminal.

13. The method of claim 12, further comprising:
maintaining a listing of associations between each of a plurality of destination network addresses and one or more network layer error control protocol-aware terminals,
wherein the first data packet is associated with the intermediate terminal in the listing of associations.

14. The method of claim 9, further comprising:
buffering the first data packet; and
discarding the buffered first data packet after processing the acknowledgement information from the received second error control header.

15. The method of claim 9, further comprising:
retransmitting data based at least in part on the second error control header.

16. The method of claim 15, wherein,
the retransmitted data comprises the first data packet;
the first data packet is identified as a data packet to be retransmitted based on the acknowledgement information;
the network layer comprises an internet protocol layer; and
an initiating terminal and end terminal comprise user terminals each remote from the intermediate terminal.

17. A terminal for implementing network layer error control for communications links, the terminal comprising:
a routing unit configured to:
identify a first data packet destined for transmission to an end terminal via an intermediate terminal, the intermediate terminal configured to process an error control header encapsulated at the network layer; and
direct processing of the first data packet to an ARQ unit based at least in part on the identification;
the ARQ unit, communicatively coupled with the routing unit, and configured to generate a first error control header for the first data packet;
an encapsulation unit, communicatively coupled with the ARQ unit, and configured to encapsulate the first error control header for transmission at the network layer appended to the first data packet;
a transmitter unit, communicatively coupled with the encapsulation unit, and configured to transmit the first error control header at the network layer appended to the first data packet; and
a receiver unit configured to receive a second data packet appended to a second error control header transmitted from the intermediate terminal in response to the first error control header, the second error control header encapsulated for transmission at the network layer and comprising acknowledgement information for the first data packet.

18. The terminal of claim 17, wherein,
the routing unit is further configured to:
identify the second data packet as a packet including error control data received in response to the first error control header; and
direct the second data packet to the ARQ unit based at least in part on the identification; and
the ARQ unit is further configured to process acknowledgement information in the second data packet, the acknowledgment information acknowledging receipt of the first error control header.

19. A method of network layer error control for communications links, the method comprising:
receiving a first data packet appended to a first error control header, the first error control header encapsulated at the network layer;
analyzing error control information in the first error control header;
generating a second error control header comprising acknowledgement information in response to the analyzed error control information; and
encapsulating the second error control header for transmission at the network layer appended to a second data packet.

20. The method of claim 19, further comprising:
forwarding the first data packet to an end terminal, the end terminal remote from a terminal performing the forwarding the first data packet step.

21. The method of claim 19, further comprising:
buffering the first data packet based at least in part on the analysis of the first error control header indicating the first data packet is an out-of-sequence data packet;
forwarding the buffered first data packet to an end terminal upon determining the first data packet has become an in-sequence data packet; and
discarding the buffered first data packet.

22. The method of claim 19, further comprising:
transmitting the second error control header and the appended second data packet via the satellite, the transmission directed to the terminal generating the first error control header.

23. The method of claim 19, further comprising:
identifying the first error control header as data for analysis generated by a network layer error control aware terminal, the network layer error control aware terminal comprising a terminal between an initiating terminal and the terminal performing the receiving the first data packet step.

24. A terminal for implementing network layer error control for communications links, the method comprising:
a routing unit configured to:
identify a first error control header encapsulated at the network layer and appended to a first data packet, the first data packet received from an initiating terminal via an intermediate terminal configured to encapsulate and transmit the first error control header at the network layer; and
direct processing of the first error control header to an ARQ unit based at least in part on the identification;
the ARQ unit, communicatively coupled with the routing unit, and configured to:
analyze error control information in the first error control header;

generate a second error control header comprising acknowledgement information in response to the analyzed error control information;
an encapsulation unit, communicatively coupled with the ARQ unit, and configured to encapsulate the second error control header for transmission at the network layer appended to a second data packet; and
a transmitter unit, communicatively coupled with the encapsulation unit, and configured to transmit the second error control header at the network layer appended to the second data packet.

* * * * *